United States Patent
Hatano et al.

(10) Patent No.: US 10,324,464 B2
(45) Date of Patent: Jun. 18, 2019

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Kunimichi Hatano, Wako (JP); Masahiko Asakura, Wako (JP); Naoto Sen, Wako (JP); Masaaki Abe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/590,229

(22) Filed: May 9, 2017

(65) Prior Publication Data

US 2017/0329330 A1 Nov. 16, 2017

(30) Foreign Application Priority Data

May 10, 2016 (JP) .................................. 2016-094526

(51) Int. Cl.
*G05D 1/00* (2006.01)
*B62D 1/28* (2006.01)
(Continued)

(52) U.S. Cl.
CPC ........... *G05D 1/0061* (2013.01); *B62D 1/286* (2013.01); *B62D 15/025* (2013.01);
(Continued)

(58) Field of Classification Search
CPC .. G05D 1/0061; G05D 1/0223; G05D 1/0088; G05D 1/021; G05D 1/0251;
(Continued)

(56) References Cited

U.S. PATENT DOCUMENTS

2016/0026180 A1* 1/2016 Tsimhoni ............. G05D 1/0061
701/23
2017/0297586 A1* 10/2017 Li ........................ G05D 1/0088
(Continued)

FOREIGN PATENT DOCUMENTS

CN      104442826 A     3/2015
CN      104724124 A     6/2015
(Continued)

OTHER PUBLICATIONS

Office Action dated Feb. 20, 2018, issued in counterpart Japanese Application No. 2016-094526, with English machine translation. (6 pages).

(Continued)

*Primary Examiner* — Rodney A Butler
(74) *Attorney, Agent, or Firm* — Westerman, Hattori, Daniels & Adrian, LLP

(57) ABSTRACT

A vehicle control system includes: an automated driving controller configured to execute one driving mode from out of a plurality of driving modes including an automated driving mode and a manual driving mode; a vehicle information collection section configured to collect information related to control history of one or both out of speed control and steering control performed based on operation by the occupant of the vehicle while the manual driving mode is being executed; and a driving characteristics derivation section configured to derive driving characteristics for each occupant of the vehicle based on information collected by the vehicle information collection section. The automated driving controller executes the automated driving mode by reflecting the driving characteristics for each occupant of the vehicle to the automated driving.

13 Claims, 18 Drawing Sheets

(51) Int. Cl.
  *G05B 19/41* (2006.01)
  *G05D 1/02* (2006.01)
  *B62D 15/02* (2006.01)
  *G05B 19/414* (2006.01)
  *B60W 30/09* (2012.01)
  *B60W 30/095* (2012.01)
  *H04L 29/08* (2006.01)

(52) U.S. Cl.
  CPC ....... *B62D 15/0255* (2013.01); *G05B 19/414* (2013.01); *G05D 1/0088* (2013.01); *G05D 1/021* (2013.01); *G05D 1/0223* (2013.01); *B60W 30/09* (2013.01); *B60W 30/095* (2013.01); *G05D 1/024* (2013.01); *G05D 1/027* (2013.01); *G05D 1/0251* (2013.01); *G05D 1/0274* (2013.01); *G05D 1/0278* (2013.01); *H04L 67/12* (2013.01)

(58) Field of Classification Search
  CPC .... G05D 1/027; G05D 1/0274; G05D 1/0278; G05D 1/024; B62D 15/025; B62D 15/0255; B62D 1/286; B60W 30/095; B60W 30/09; H04L 67/12; G05B 19/414
  See application file for complete search history.

(56) References Cited

U.S. PATENT DOCUMENTS

2017/0369052 A1* 12/2017 Nagy .................... B60W 50/08
2018/0074497 A1*  3/2018 Tsuji ................. G06K 9/00288

FOREIGN PATENT DOCUMENTS

| JP | 7-108849 A    | 4/1995  |
| JP | 2006-347531 A | 12/2006 |
| JP | 2015-182526 A | 10/2015 |
| WO | 2011/158347 A1| 12/2011 |

OTHER PUBLICATIONS

Office Action dated Feb. 15, 2019, issued in counterpart CN application No. 201710288770.4, with English translation. (17 pages).

Chinese Search Report dated Jan. 23, 2019, issued in counterpart application No. 2017102887704. (2 pages).

* cited by examiner

FIG. 3
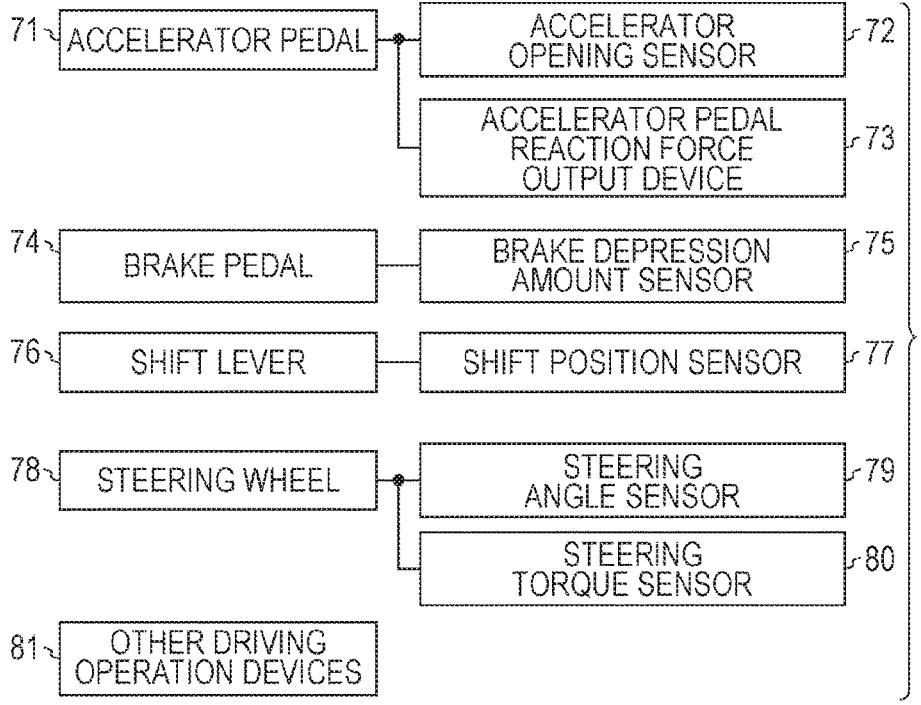
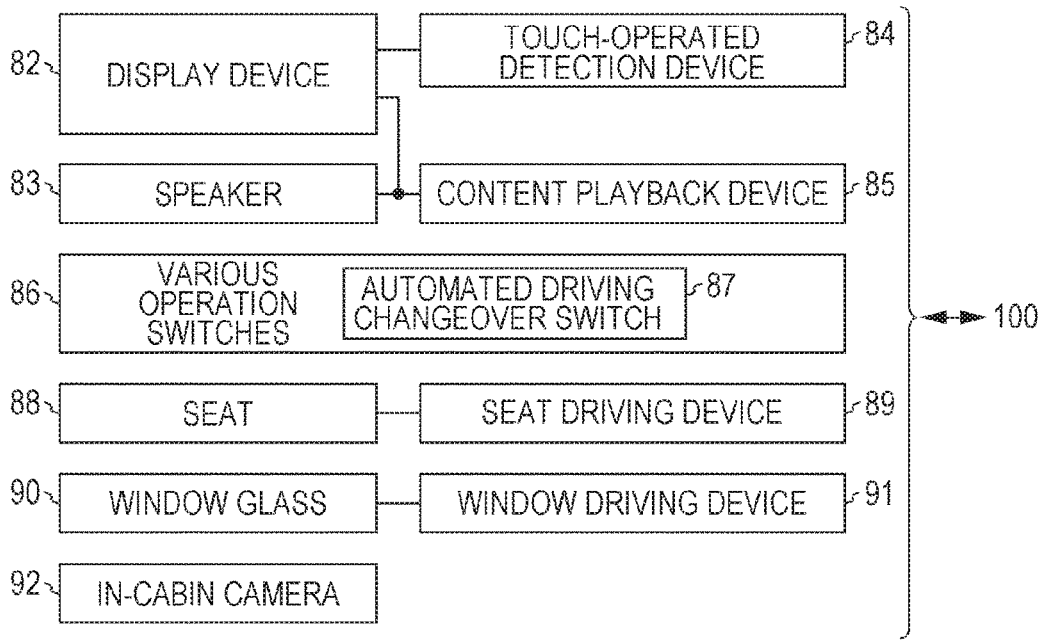

182

| OCCUPANT ID | PERSON IDENTIFICATION IMAGE | DRIVING OPERATION HISTORY |
|---|---|---|
| USER_A | ** | ** |
| USER_B | ** | ** |
| USER_C | ** | ** |
| ... | ... | ... |

| OCCUPANT ID | PERSON IDENTIFICATION IMAGE | DRIVING CHARACTERISTICS | | ... |
| --- | --- | --- | --- | --- |
| | | ORDINARY ROAD (LOW-TO-MEDIUM SPEED REGION) | EXPRESSWAY (HIGH SPEED REGION) | |
| USER_A | ** | ** | ** | ... |
| USER_B | ** | ** | ** | ... |
| USER_C | ** | ** | ** | ... |
| ... | ... | ... | ... | ... |

| NON-DRIVING OPERATION SYSTEM \ DRIVING MODE | MANUAL DRIVING MODE | AUTOMATED DRIVING MODE | | | ... |
| --- | --- | --- | --- | --- | --- |
| | | MODE A | MODE B | MODE C | |
| NAVIGATION OPERATION | NOT PERMITTED | PERMITTED | PERMITTED | NOT PERMITTED | ... |
| CONTENT PLAYBACK OPERATION | NOT PERMITTED | PERMITTED | NOT PERMITTED | NOT PERMITTED | ... |
| INSTRUMENT PANEL OPERATION | NOT PERMITTED | PERMITTED | PERMITTED | PERMITTED | ... |
| ... | ... | ... | ... | ... | ... |

| ROAD TYPE | MANUAL DRIVING MODE | LEARNED MODE (AUTOMATED DRIVING MODE) |
|---|---|---|
| ORDINARY ROAD (LOW-TO-MEDIUM SPEED REGION) | DRIVING CHARACTERISTICS A | REFLECT DRIVING CHARACTERISTICS A |
| EXPRESSWAY (HIGH SPEED REGION) | DRIVING CHARACTERISTICS B | REFLECT DRIVING CHARACTERISTICS B |
| ... | ... | ... |

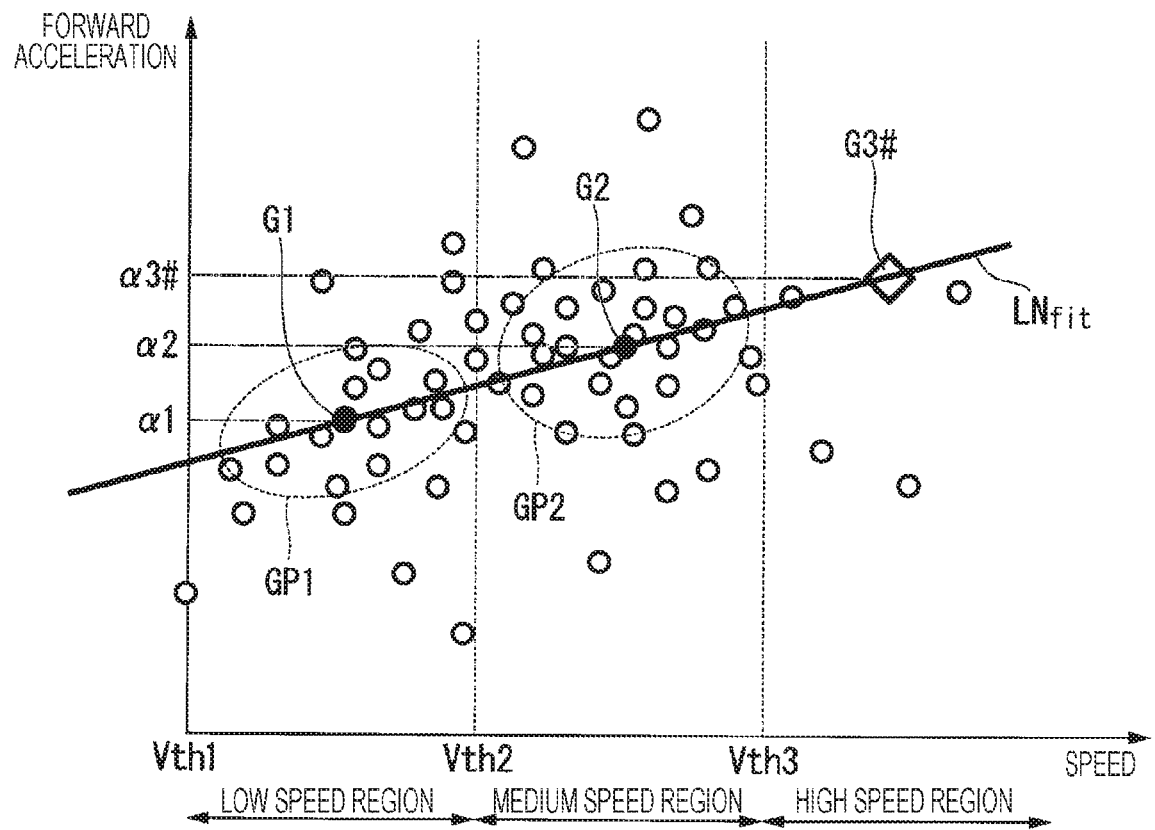

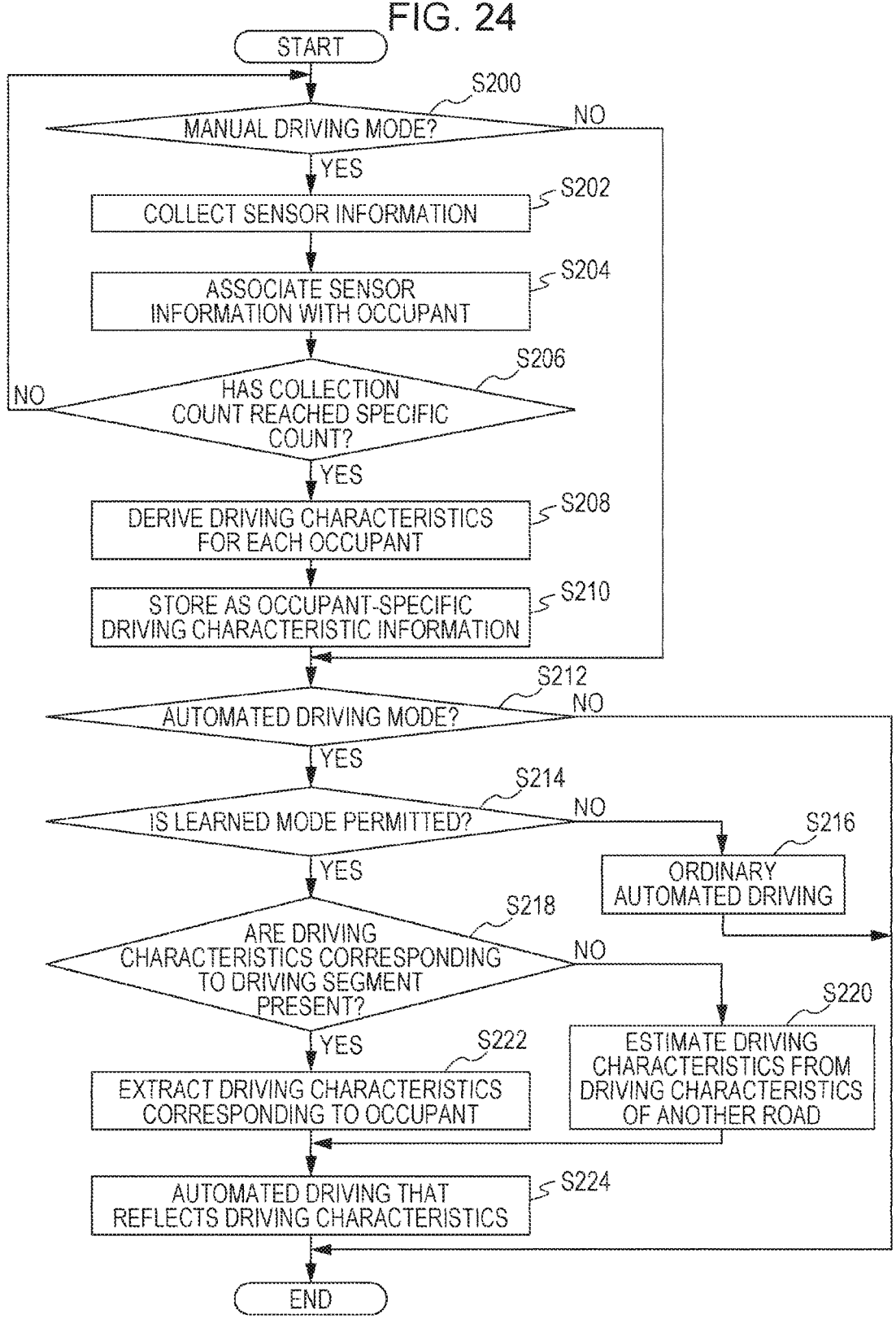

VEHICLE CONTROL SYSTEM, VEHICLE CONTROL METHOD, AND VEHICLE CONTROL PROGRAM

CROSS REFERENCES TO RELATED APPLICATIONS

The present application claims priority under 35 U.S.C. § 119 to Japanese Patent Application No. 2016-094526, filed May 10, 2016, entitled "Vehicle Control System, Vehicle Control Method, and Vehicle Control Program." The contents of this application are incorporated herein by reference in their entirety.

TECHNICAL FIELD

The present disclosure relates to a vehicle control system, a vehicle control method, and a vehicle control program.

BACKGROUND

Recently, research into technology for automated control of at least one out of acceleration/deceleration or steering of a vehicle (referred to as automated driving hereafter) has been progressing. International Publication No. 2011/158347 is an example of related art.

However, in related technology, user preferences regarding control characteristics related to acceleration/deceleration or steering have not been reflected in automated driving.

SUMMARY

The present disclosure describes a vehicle control system, a vehicle control method, and a vehicle control program capable of reflecting user preferences regarding control characteristics related to acceleration/deceleration or steering in automated driving.

A first aspect of the present disclosure is a vehicle control system including an automated driving controller, a collection section, and a driving characteristics derivation section. The automated driving controller is configured to execute one driving mode from out of plural driving modes including an automated driving mode in which at least one of speed control or steering control of a vehicle is performed automatically, and a manual driving mode in which both the speed control and the steering control are performed based on operation by an occupant of the vehicle. The collection section is configured to collect information related to control history of one or both out of the speed control and the steering control performed based on operation by the occupant of the vehicle while the manual driving mode is being executed by the automated driving controller. The driving characteristics derivation section is configured to derive driving characteristics for each occupant of the vehicle based on information collected by the collection section. The automated driving controller executes the automated driving mode in which the driving characteristics for each occupant of the vehicle derived by the driving characteristics derivation section are reflected.

A second aspect of the present disclosure is the vehicle control system according to the first aspect, wherein configuration may be made such that the driving characteristics include at least one selected from out of the group consisting of characteristics related to speed, acceleration, jerk, yaw rate, lateral acceleration, and steering angle of the vehicle. In the present application, the acceleration includes negative values, that is, deceleration.

A third aspect of the present disclosure is the vehicle control system according to the first or second aspect, wherein configuration may be made such that the automated driving controller executes one driving mode out of the plural driving modes based on a plan including a route on which to make the vehicle travel, the collection section collects information related to the control history separately for each type of route the vehicle travels on, and when the plan expects the automated driving mode to be executed while the vehicle is traveling on a first route, the driving characteristics derivation section derives the driving characteristics of an occupant for a second route set with the same or stricter speed limit compared to the speed limit set for the first route based on information collected when the vehicle traveled on the second route in the manual driving mode from out of the information collected by the collection section, so as to reflect the driving characteristics on the second route in the automated driving mode for the first route.

A fourth aspect of the present disclosure is the vehicle control system according to the third aspect, wherein configuration may be made such that: based on the information collected by the collection section, the driving characteristics derivation section derives the driving characteristics for each of a first speed region and a second speed region having a higher speed than the first speed region and having a speed limit which is the speed limit set in the first route or lower; based on the driving characteristics derived for each of the speed regions, the driving characteristics derivation section estimates the driving characteristics on the first route to be those of a third speed region having a higher speed than the second speed region; and on the first route, the automated driving controller executes the automated driving mode in which the driving characteristics estimated by the driving characteristics derivation section are reflected.

A fifth aspect of the present disclosure is the vehicle control system according to any one out of the first aspect to the fourth aspect, wherein configuration may be made such that the driving characteristics derivation section references information having a high collection frequency from out of the information collected by the collection section, and derives driving characteristics for each occupant of the vehicle.

A sixth aspect of the present disclosure is the vehicle control system according to the fifth aspect, wherein configuration may be made such that the driving characteristics derivation section sets a gain for the derived driving characteristics so as to eliminate a difference between a speed sensation felt by an occupant of the vehicle in manual driving mode and a speed sensation felt by the occupant of the vehicle in automated driving mode.

A seventh aspect of the present disclosure is the vehicle control system according to the fifth aspect, which may further include an operation section that receives operation from an occupant of the vehicle to change a setting of the gain. Therein, configuration may be made such that the driving characteristics derivation section changes the gain set for the derived driving characteristics based on the operation on the operation section.

An eighth aspect of the present disclosure is the vehicle control system according to the seventh aspect, wherein configuration may be made such that the driving characteristics derivation section changes the gain set for the derived driving characteristics to a setting having a high change frequency.

A ninth aspect of the present disclosure is a vehicle control method executed by an onboard computer. The method includes: executing one driving mode from out of plural driving modes including an automated driving mode in which at least one of speed control or steering control of a vehicle is performed automatically, and a manual driving mode in which both the speed control and the steering control are performed based on operation by an occupant of the vehicle; collecting information related to control history of one or both out of the speed control and the steering control performed based on operation by the occupant of the vehicle while the manual driving mode is being executed; deriving driving characteristics for each occupant of the vehicle based on the collected information; and executing the automated driving mode such that the driving characteristics derived for each occupant of the vehicle are reflected in the automated driving mode.

A tenth aspect of the present disclosure is an onboard control program for causing an onboard computer to execute processing. The processing includes: executing one driving mode from out of plural driving modes including an automated driving mode in which at least one of speed control or steering control of a vehicle is performed automatically, and a manual driving mode in which both the speed control and the steering control are performed based on operation by an occupant of the vehicle; collecting information related to control history of one or both out of the speed control and the steering control performed based on operation by the occupant of the vehicle while the manual driving mode is being executed; deriving driving characteristics for each occupant of the vehicle based on the collected information; and executing the automated driving mode such that the driving characteristics derived for each occupant of the vehicle are reflected in the automated driving mode.

According to one embodiment, user preferences regarding control characteristics related to acceleration/deceleration or steering can be reflected in automated driving.

BRIEF DESCRIPTION OF THE DRAWINGS

The advantages of the disclosure will become apparent in the following description taken in conjunction with the following drawings.

FIG. 3 is a configuration diagram of an HMI.

FIG. 16 is a diagram illustrating an example of occupant-specific driving characteristic information.

FIG. 17 is a diagram illustrating an example of mode-specific operation permission information.

FIG. 22 is a diagram illustrating content of learned modes according to each type of road.

FIG. 23 is a diagram for explaining a method of deriving driving characteristics.

FIG. 24 is a flowchart illustrating an example of a flow of processing performed by a vehicle control system of a second embodiment.

DETAILED DESCRIPTION

Explanation follows regarding embodiments of a vehicle control system, a vehicle control method, and a vehicle control program of the present disclosure, with reference to the drawings.

Common Configuration

Figure 1:
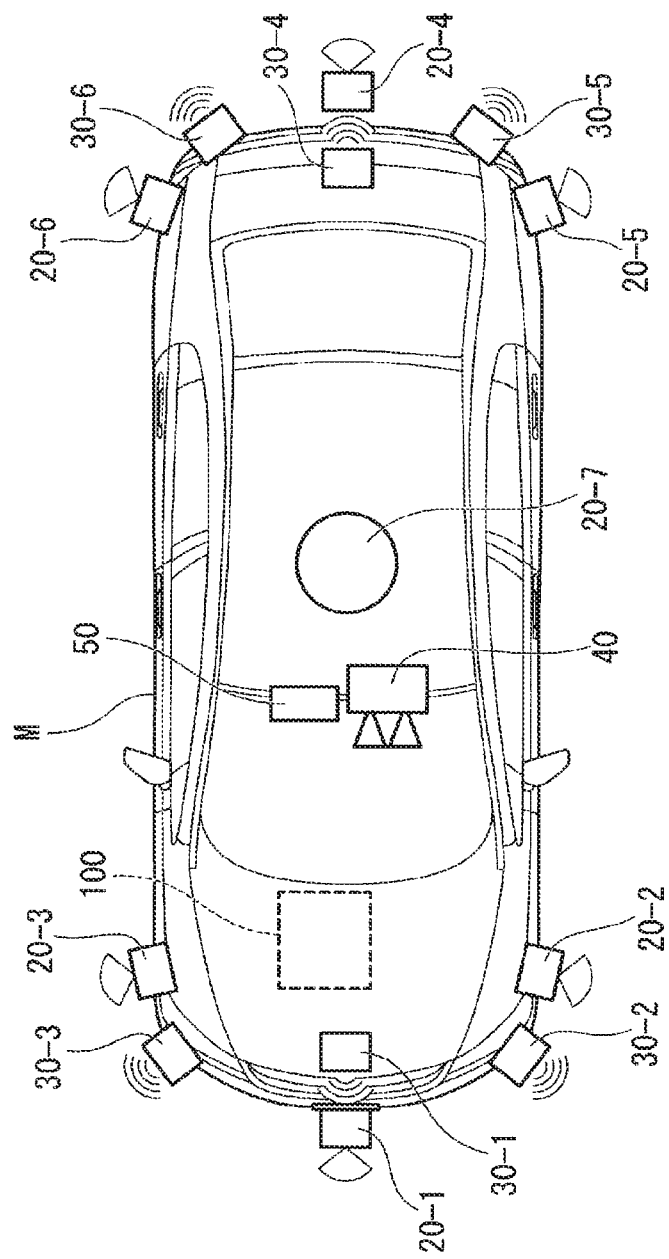
FIG. 1 is a diagram illustrating configuration elements of a vehicle.

FIG. 1 is a diagram illustrating configuration elements of a vehicle (referred to as the vehicle M hereafter) installed with a vehicle control system 100 of each embodiment. The vehicle installed with the vehicle control system 100 is, for example, a two-wheeled, three-wheeled, or four-wheeled automobile, and this encompasses automobiles having an internal combustion engine such as a diesel engine or gasoline engine as a power source, electric automobiles having an electric motor as a power source, and hybrid automobiles having both an internal combustion engine and an electric motor. Electric automobiles are, for example, driven using electric power discharged from a battery such as a secondary cell, a hydrogen fuel cell, a metal fuel cell, or an alcohol fuel cell.

As illustrated in FIG. 1, sensors such as finders 20-1 to 20-7, radars 30-1 to 30-6, and a camera 40; a navigation device 50; and the vehicle control system 100 are installed to the vehicle M.

The finders 20-1 to 20-7 are, for example, LIDARs (Light Detection and Ranging, or Laser Imaging Detection and Ranging) that measure the scattering of emitted light and measure the distance to a target. For example, the finder 20-1 is attached to a front grille or the like, and the finder 20-2 and the finder 20-3 are attached to a side face of a vehicle body, a door mirror, a front headlamp interior, the vicinity of a side lamp, or the like. The finder 20-4 is attached to a trunk lid or the like, the finder 20-5 and the finder 20-6 are attached to a side face of the vehicle body, a tail light interior, or the like. The finders 20-1 to 20-6 described above have detection regions of, for example, approximately 150° in a horizontal direction. The finder 20-7 is attached to a roof or the like. The finder 20-7 has a detection region of, for example, 360° in the horizontal direction.

The radar 30-1 and the radar 30-4 are, for example, long-range millimeter wave radars having a wider detection region in a depth direction than the other radars. The radars 30-2, 30-3, 30-5, 30-6 are intermediate-range millimeter wave radars having a narrower detection region in the depth direction than the radars 30-1 and 30-4.

Hereafter, the finders 20-1 to 20-7 are simply referred to as "finders 20" in cases in which no particular distinction is made, and the radars 30-1 to 30-6 are simply referred to as "radars 30" in cases in which no particular distinction is made. The radars 30, for example, detect objects using a frequency modulated continuous wave (FM-CW) method.

The camera 40 is, for example, a digital camera that employs a solid state imaging element such as a charge coupled device (CCD) or a complementary metal oxide semiconductor (CMOS) element. The camera 40 is attached to a front windshield upper portion, a back face of a rear-view mirror, or the like. The camera 40, for example, periodically and repeatedly images ahead of the vehicle M. The camera 40 may be a stereo camera that includes plural cameras.

Note that the configuration illustrated in FIG. 1 is merely an example; a portion of the configuration may be omitted, and other configuration may be further added.

First Embodiment

Figure 2:
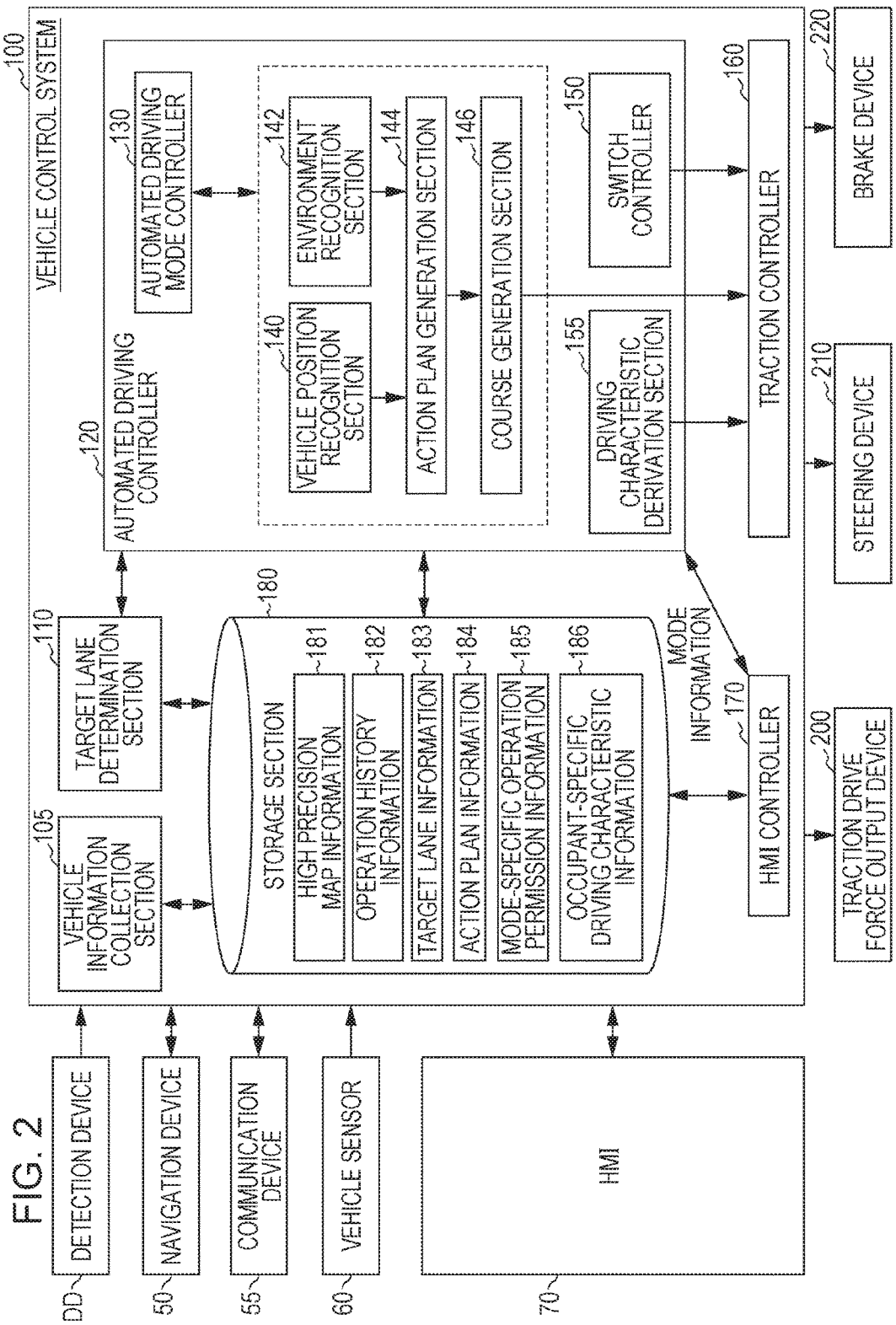
FIG. 2 is a functional configuration diagram centered on a vehicle control system.

FIG. 2 is a functional configuration diagram focusing on the vehicle control system 100 according to the first embodiment. Detection devices DD that include the finders 20, the radars 30, the camera 40, and the like; the navigation device 50; a communication device 55; vehicle sensors 60; a human machine interface (HMI) 70; the vehicle control system 100; a traction drive force output device 200; a steering device 210; and a brake device 220 are installed in the vehicle M. These devices and apparatuses are connected to one another by a multiplex communication line such as a controller area network (CAN) communication line, or by a wireless communication network, a serial communication line, or the like. Note that the vehicle control system within the scope of the claims does not indicate only the "vehicle control system 100" and may include configuration other than that of the vehicle control system 100 (such as the detection devices DD and a HMI 70).

The navigation device 50 includes a global navigation satellite system (GNSS) receiver, map information (a navigation map), a touch panel display device that functions as a user interface, a speaker, a microphone, and the like. The navigation device 50 identifies the position of the vehicle M using the GNSS receiver and derives a route from this position to a destination designated by a user. The route derived by the navigation device 50 is provided to a target lane determination section 110 of the vehicle control system 100. The position of the vehicle M may be identified or complemented by an inertial navigation system (INS) employing output from the vehicle sensors 60. When the vehicle control system 100 is executing a manual driving mode, the navigation device 50 provides guidance along a route to the destination using audio and a navigation display. Note that configuration for identifying the position of the vehicle M may be provided independently from the navigation device 50. Moreover, the navigation device 50 may, for example, be implemented by functionality of a terminal device such as a smartphone or a tablet terminal possessed by the user. In such cases, information is exchanged between the terminal device and the vehicle control system 100 using wireless or wired communication.

The communication device 55, for example, performs wireless communication using a cellular network, a Wi-Fi network, Bluetooth (registered trademark), dedicated short range communication (DSRC), or the like.

The vehicle sensors 60 include, for example, a vehicle speed sensor that detects vehicle speed, an acceleration sensor that detects acceleration, a jerk computing circuit for deriving jerk by differentiation of the acceleration detected by the acceleration sensor (the computation may be performed by the vehicle control system 100), a yaw rate sensor that detects angular velocity about a vertical axis, and a directional sensor that detects the heading of the vehicle M.

FIG. 3 is a configuration diagram of the HMI 70. The HMI 70 is provided with, for example, driving operation system configuration and non-driving operation system configuration. There is no clear boundary between the two, and driving operation system configuration may provide non-driving operation system functionality (or vise-versa).

As configuration of the driving operation system, the HMI 70 includes, for example, an accelerator pedal 71, an accelerator opening sensor 72 and an accelerator pedal reaction force output device 73, a brake pedal 74 and a brake depression amount sensor (or a master pressure sensor or the like) 75, a shift lever 76 and a shift position sensor 77, a steering wheel 78, a steering angle sensor 79 and a steering torque sensor 80, and other driving operation devices 81.

The accelerator pedal 71 is an operation element for receiving acceleration instructions from a vehicle occupant (or deceleration instructions due to return-operation). The accelerator opening sensor 72 detects a depression amount of the accelerator pedal 71, and outputs an accelerator opening signal indicating the depression amount to the vehicle control system 100. Note that output may be made directly to the traction drive force output device 200, the steering device 210, or the brake device 220 instead of outputting to the vehicle control system 100. Similar applies for other configuration of the driving operation system explained below. The accelerator pedal reaction force output device 73, for example, outputs force (an operation reaction force) in the opposite direction to the operation direction of the accelerator pedal 71, according to instructions from the vehicle control system 100.

The brake pedal 74 is an operation element for receiving deceleration instructions from the vehicle occupant. The brake depression amount sensor 75 detects a depression amount of (alternatively, the pressing force on) the brake pedal 74 and outputs a brake signal indicating the detection result to the vehicle control system 100.

The shift lever 76 is an operation element for receiving shift level change instructions from the vehicle occupant. The shift position sensor 77 detects the shift level instructed by the vehicle occupant and outputs a shift position signal indicating the detection result to the vehicle control system 100.

The steering wheel 78 is an operation element for receiving turning instructions from the vehicle occupant. The steering angle sensor 79 detects the operation angle of the steering wheel 78 and outputs a steering angle signal indicating the detection result to the vehicle control system 100. The steering torque sensor 80 detects the torque placed on the steering wheel 78 and outputs a steering torque signal indicating the detection result to the vehicle control system 100.

The other driving operation devices 81 are, for example, a joystick, a button, a dial switch, a graphical user interface (GUI) switch, and the like. The other driving operation devices 81 receive acceleration instructions, deceleration instructions, turning instructions, and the like and output the instructions to the vehicle control system 100.

As configuration of the non-driving operation system, the HMI 70 includes, for example, a display device 82, a speaker 83, a touch-operated detection device 84 and a content playback device 85, various operation switches 86, a seat 88 and a seat driving device 89, window glass 90 and a window driving device 91, and an in-cabin camera 92. The non-driving operation system configuration of the HMI 70 is an example of an "operation section".

The display device 82 is, for example, a liquid crystal display (LCD), an organic electroluminescent (EL) display device, or the like attached to a respective section of an instrument panel, a freely selected location facing the front passenger seat and rear seat, or the like. Moreover, the display device 82 may be a head-up display (HUD) that projects an image onto the front windshield or another window. The speaker 83 outputs audio. In cases in which the display device 82 is a touch panel, the touch-operated detection device 84 detects contact positions (touched positions) on the display screen of the display device 82 and outputs the contact positions to the vehicle control system 100. Note that in cases in which the display device 82 is not a touch panel, the touch-operated detection device 84 may be omitted.

The content playback device 85 includes, for example, a digital versatile disc (DVD) playback device, a compact disc (CD) playback device, a television receiver, various guidance image generation devices, and the like. Some or all out of the display device 82, the speaker 83, the touch-operated detection device 84, and the content playback device 85 may be configured so as to be shared with the navigation device 50.

The various operation switches 86 are disposed at freely selected locations inside the vehicle cabin. The various operation switches 86 include an automated driving changeover switch 87 for instructing automated driving to start (or to start in the future) or stop. The automated driving changeover switch 87 may be a graphical user interface (GUI) switch or a mechanical switch. Moreover, the various operation switches 86 may include a switch for driving the seat driving device 89 or window driving device 91.

The seat 88 is a seat in which the vehicle occupant sits. The seat driving device 89 freely drives the reclining angle, front-rear direction position, yaw angle, and the like of the seat 88. The window glass 90 is, for example, provided to each door. The window driving device 91 drives opening and closing of the window glass 90.

The in-cabin camera 92 is a digital camera that employs a solid state imaging element such as a CCD or a CMOS element. The in-cabin camera 92 is attached to a position from which at least the head of the vehicle occupant performing driving operation can be imaged, such as the rear-view mirror, steering wheel boss section, or instrument panel. The camera 40, for example, images the vehicle occupant periodically and repeatedly.

Prior to explaining the vehicle control system 100, explanation follows regarding the traction drive force output device 200, the steering device 210, and the brake device 220.

The traction drive force output device 200 outputs traction drive force (torque) for causing the vehicle to travel to drive wheels. In cases in which the vehicle M is an automobile that has an internal combustion engine as the power source, the traction drive force output device 200 includes, for example, an engine, a transmission, and an engine electronic control unit (ECU) that controls the engine. In cases in which the vehicle M is an electric automobile that has an electric motor as the power source, the traction drive force output device 200 includes, for example, a traction motor and a motor ECU that controls the traction motor. In cases in which the vehicle M is a hybrid automobile, the traction drive force output device 200 includes, for example, an engine, a transmission, and an engine ECU; and a traction motor and a motor ECU. In cases in which the traction drive force output device 200 includes only an engine, the engine ECU adjusts the engine throttle opening, the shift level, or the like, in accordance with information input from a traction controller 160, described later. In cases in which the traction drive force output device 200 includes only a traction motor, the motor ECU adjusts a duty ratio of a PWM signal applied to the traction motor, in accordance with information input from the traction controller 160. In cases in which the traction drive force output device 200 includes an engine and a traction motor, the engine ECU and the motor ECU cooperatively control traction drive force, in accordance with information input from the traction controller 160.

The steering device 210 includes, for example, a steering ECU and an electric motor. The electric motor, for example, exerts force in a rack-and-pinion mechanism to change the orientation of the steering wheel. The steering ECU drives the electric motor in accordance with information input from the vehicle control system 100, or input information regarding the steering angle or steering torque, and changes the orientation of the steering wheel.

The brake device 220 is, for example, an electric servo brake device including a brake caliper, a cylinder that transmits hydraulic pressure to the brake caliper, an electric motor that causes the cylinder to generate hydraulic pressure, and a brake controller. The brake controller of the electric servo brake device controls an electric motor in accordance with information input from the traction controller 160, such that braking torque is output to each wheel in accordance with the braking operation. The electric servo brake device may include a mechanism that transmits hydraulic pressure generated due to operation of the brake pedal to the cylinder via a master cylinder as a backup. Note that the brake device 220 is not limited to the electric servo brake device explained above and may be an electronically controlled hydraulic brake device. The electronically controlled hydraulic brake device controls an actuator in accordance with information input from the traction controller 160 and transmits hydraulic pressure of a master cylinder to the cylinder. The brake device 220 may also include a regenerative brake that uses a traction motor which might be included in the traction drive force output device 200.

Vehicle Control System

Explanation follows regarding the vehicle control system 100. The vehicle control system 100 is, for example, implemented by one or more processors, or by hardware having equivalent functionality such as circuitry. The vehicle control system 100 may be configured by a combination of a processor such as a CPU, a storage device, and an ECU (electronic control unit) in which a communication interface is connected by an internal bus, or a micro-processing unit (MPU) or the like.

Returning to FIG. 2, the vehicle control system 100 includes, for example, a vehicle information collection section 105, the target lane determination section 110, an automated driving controller 120, the traction controller 160, an HMI controller 170, and a storage section 180. The automated driving controller 120 includes, for example, an automated driving mode controller 130, a vehicle position recognition section 140, an environment recognition section 142, an action plan generation section 144, a course generation section 146, a switch controller 150, and a driving characteristics derivation section 155.

Some or all out of the vehicle information collection section 105, the target lane determination section 110, each section of the automated driving controller 120, the traction controller 160, and the HMI controller 170 are implemented by a processor executing a program (software). Moreover, some or all of these may be implemented by hardware such as a large scale integration (LSI) or an application specific integrated circuit (ASIC), or may be implemented by a combination of software and hardware.

The storage section 180 stores information such as high precision map information 181, operation history information 182, target lane information 183, action plan information 184, mode-specific operation permission information 185, and occupant-specific driving characteristic information 186. The storage section 180 is implemented by read only memory (ROM) or random access memory (RAM), a hard disk drive (HDD), flash memory, or the like. The program executed by the processor may be pre-stored in the storage section 180, or may be downloaded from an external device via an onboard internet setup or the like. Moreover, the program may be installed in the storage section 180 by loading a portable storage medium storing the program into a drive device, not illustrated in the drawings. Moreover, the vehicle control system 100 may be configured distributed across plural computer devices.

The vehicle information collection section 105 measures the operation amount when the driving operation system of the HMI 70 has been operated on. For example, the vehicle information collection section 105 collects (acquires) various operation amounts, such as the depression amount of the accelerator pedal 71 detected by the accelerator opening sensor 72, the depression amount of the brake pedal 74 detected by the brake depression amount sensor 75, and the operation angle of the steering wheel 78 detected by the steering angle sensor 79, from the corresponding sensors at specific periods. Moreover, the vehicle information collection section 105 collects various detection values form the vehicle sensors 60 at specific periods. The vehicle information collection section 105 then associates, with the information collected from the various sensors, an image of the occupant seated in the driver seat 88 that was captured by the in-cabin camera 92 when collecting information from the various sensors. The associated items of information are stored in the storage section 180 as the operation history information 182.

Figures 4, 5:
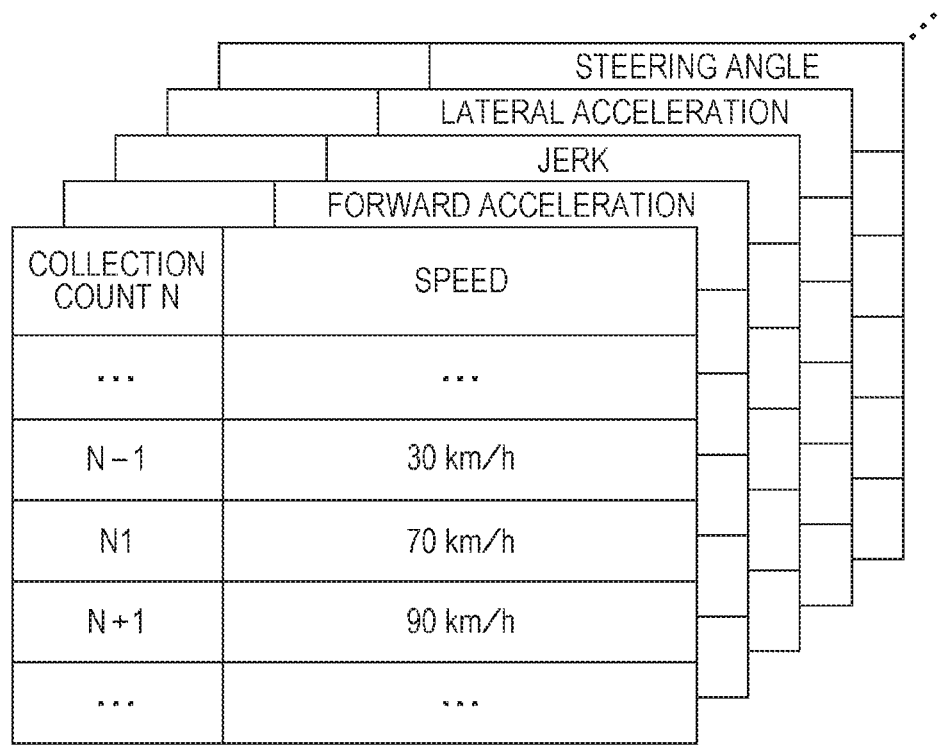
FIG. 4 is a diagram illustrating an example of operation history information.
FIG. 5 is a diagram illustrating an example of driving operation history.

FIG. 4 is a diagram illustrating an example of the operation history information 182. As illustrated in the figure, the operation history information 182 associates an image (person identification image) captured by the in-cabin camera 92 and driving operation history indicating information collected from the various sensors, with the identification information (occupant ID) for identifying a freely determined occupant. The image captured by the in-cabin camera 92 is employed to switch the information reading for each occupant in the processing described later.

FIG. 5 is diagram of an example of driving operation history. In the figure, the driving operation history sensor information, namely, speed, forward acceleration and lateral acceleration, jerk, and steering angle, are associated which each collection count N at each specific period. The associated sensor information may be peak (maximum value) information, may be information such as a histogram associating detected values with frequency, or may be a result of statistical processing such as an average value, a median value, or a modal value. Forward acceleration is acceleration in the direction of progress of the vehicle M, and lateral acceleration is acceleration received in the vehicle width direction of the vehicle M with respect to the direction of progress of the vehicle M. Moreover, the jerk may be the amount of change with time in the forward acceleration, or may be the amount of change with time in lateral acceleration. The steering angle may be based on the operation angle of the steering wheel 78 detected by the steering angle sensor 79, or may be indirectly derived from information such as the forward acceleration and the lateral acceleration.

Figure 6:
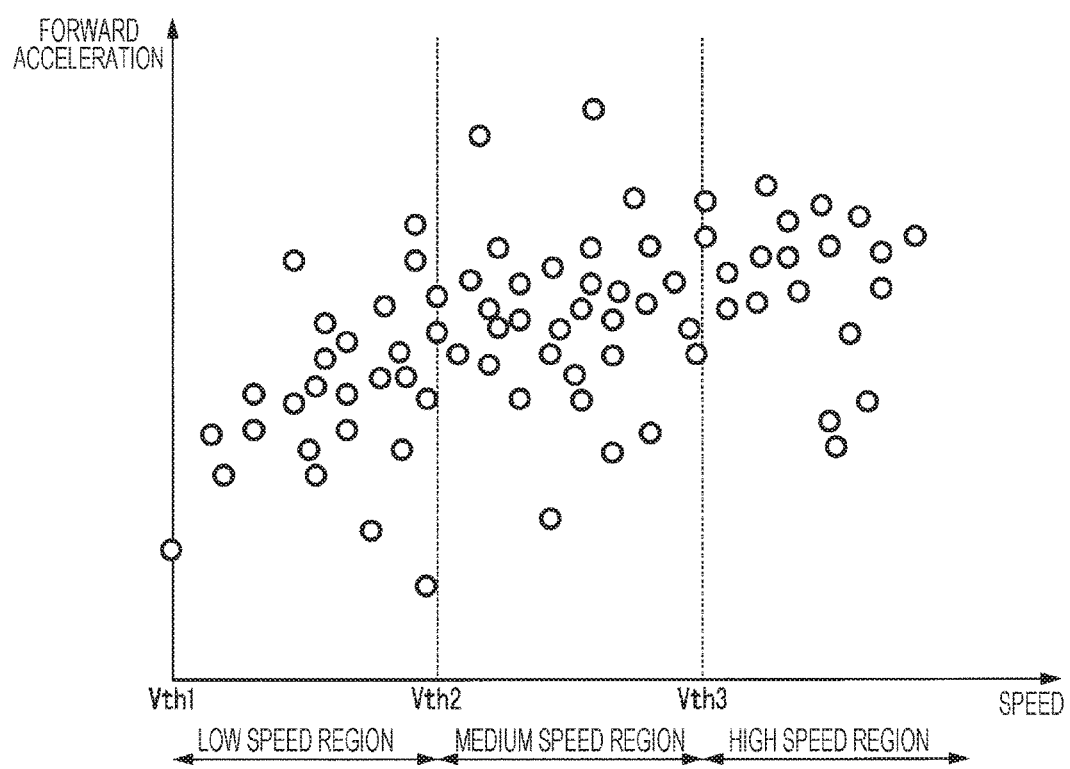
FIG. 6 is a plot of driving operation history converted into a speed distribution.

FIG. 6 is a diagram of driving operation history converted into a speed distribution. In the drawings, the horizontal axis represents the speed of the vehicle M when sensor information was collected, and the vertical axis represents forward acceleration as an example. Namely, the figure is a bivariate distribution plot of the speed and forward acceleration. In the explanation that follows, processing by the driving characteristics derivation section 155 described later employs a distribution plot such as that of the figure.

The target lane determination section 110 is, for example, implemented by an MPU. The target lane determination section 110 divides the route provided from the navigation device 50 into plural blocks (for example, divides the route every 100 m along the direction of progress of the vehicle), and references the high precision map information 181 to determine the target lane for each block. The target lane determination section 110, for example, determines which lane number from the left to travel in. In cases in which a junction point, a merge point, or the like is present in the route, the target lane determination section 110, for example, determines the target lanes so as to enable the vehicle M to travel along a sensible travel route for advancing beyond the junction. The target lanes determined by the target lane determination section 110 are stored in the storage section 180 as the target lane information 183.

The high precision map information 181 is map information with higher precision than the navigation map of the navigation device 50. The high precision map information 181 includes, for example, lane-center information, lane-boundary information, or the like. The high precision map information 181 may also include, for example, road information, traffic restriction information, address information (address, postal code), facilities information, phone number information, and the like. The road information includes information such as information indicating whether the type of road is an expressway, a toll road, a national highway, or a prefectural road; the number of lanes in the road; the width of each lane; the gradient of the road; the position of the road (three dimensional coordinates including a longitude, a latitude, and an altitude); the curvature of the lanes; the position of lane merge and junction points; and signage provided on the road. The road information may further include information related to speed limits (for example, a legal speed limit) for each road or for each lane of a road. The traffic restriction information includes information regarding lane closures due to road work, traffic accidents, congestion, and the like.

The automated driving mode controller 130 determines the automated driving mode to be executed by the automated driving controller 120. The automated driving mode in the present embodiment includes the following modes. Note that the following modes are merely examples, and the number of modes of the automated driving may be freely determined.

Mode A

Mode A is the mode in which the level of automated driving is highest. In cases in which Mode A is being implemented, all vehicle controls, such as complex merging control, are performed automatically, such that a vehicle occupant does not need to monitor the surroundings or state of the vehicle M.

Mode B

Mode B is the mode having the next highest level of automated driving after Mode A. Although in principle all vehicle control is performed automatically in cases in which Mode B is implemented, the driving operation of the vehicle M may be entrusted to the vehicle occupant depending on the situation. The vehicle occupant therefore needs to monitor the surroundings and state of the vehicle M.

Mode C

Mode C is the mode having the next highest level of automated driving after Mode B. In cases in which Mode C is implemented, the vehicle occupant needs to perform confirmation operations on the HMI 70 depending on the situation. In Mode C, for example, the vehicle occupant is notified of the timing for a lane change, and the lane change is made automatically in cases in which the vehicle occupant has performed an operation on the HMI 70 instructing the lane change. The vehicle occupant therefore needs to monitor the surroundings and state of the vehicle M.

The automated driving mode controller 130 determines the automated driving mode based on operation on the HMI 70 by the vehicle occupant, events determined by the action plan generation section 144, traveling states determined by the course generation section 146, and the like. The automated driving mode is notified to the HMI controller 170. Moreover, a limit that depends on the performance of the detection devices DD of the vehicle M or the like may be set on the automated driving mode. For example, configuration may be such that the Mode A is not implemented in cases in which the performance of the detection devices DD is low. Whichever the mode, switching to manual driving mode (override) is possible by operating the driving operation system configuration of the HMI 70.

The vehicle position recognition section 140 of the automated driving controller 120 recognizes the lane in which the vehicle M is traveling (the travel lane) and the position of the vehicle M relative to the travel lane, based on the high precision map information 181 stored in the storage section 180, and the information input from the finders 20, the radars 30, the camera 40, the navigation device 50, or the vehicle sensors 60.

The vehicle position recognition section 140, for example, recognizes the travel lane by comparing a pattern of road demarcation lines (for example, an array of solid lines and dashed lines) recognized in the high precision map information 181 against a road demarcation line pattern of the surroundings of the vehicle M recognized in the images imaged using the camera 40. In the recognition, the position of the vehicle M acquired from the navigation device 50 or the processing result by the INS may be taken into account.

Figure 7:
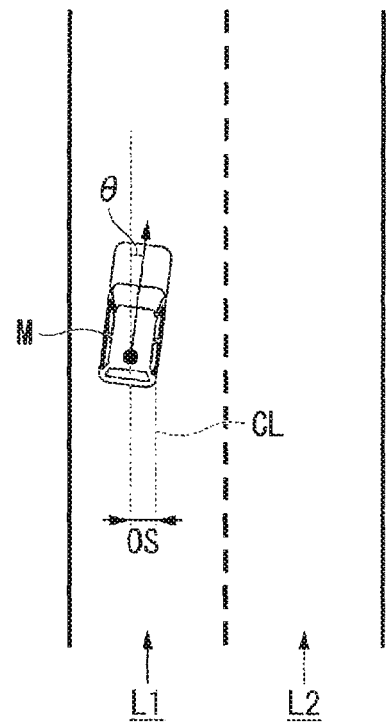
FIG. 7 is a diagram illustrating a state in which a position of a vehicle relative to a traveling lane is recognized by a vehicle position recognition section.

FIG. 7 is a diagram illustrating a state in which the relative position of the vehicle M with respect to a travel lane L1 is recognized by the vehicle position recognition section 140. As the relative position of the vehicle M with respect to the travel lane L1, the vehicle position recognition section 140 recognizes an offset OS between a reference point (for example, the center of mass) of the vehicle M and a travel lane center CL, and an angle θ formed between the direction of progress of the vehicle M and a line aligned with the travel lane center CL. Note that, alternatively, the vehicle position recognition section 140 may recognize the position of the reference point of the vehicle M or the like with respect to either of the side end portions of the lane L1 itself as the relative position of the vehicle M with respect to the travel lane. The relative position of the vehicle M recognized by the vehicle position recognition section 140 is provided to the target lane determination section 110.

The environment recognition section 142 recognizes the position, speed, and acceleration states of nearby vehicles based on the information input from the finders 20, the radars 30, the camera 40, and the like. Nearby vehicles are, for example, vehicles that are traveling in the surroundings of the vehicle M and that are traveling in the same direction as the vehicle M. The positions of the nearby vehicles may be presented as representative points such as centers of mass or corners of other vehicles, or may be represented as regions expressed by the outlines of the other vehicles. The "state" of a nearby vehicle may include whether or not the nearby vehicle is accelerating or changing lanes (or whether or not the nearby vehicle is attempting to change lanes), as ascertained based on the information of the various apparatuses described above. The environment recognition section 142 may also recognize the position of a guard rail, a utility pole, a parked vehicle, a pedestrian, and other objects in addition to the nearby vehicles.

The action plan generation section 144 sets a starting point of automated driving and/or a destination of automated driving. The starting point of automated driving may be the current position of the vehicle M, or may be a point set by operation to instruct automated driving. The action plan generation section 144 generates an action plan in the segments between the starting point and the destination of automated driving. Note that there is no limitation thereto, and the action plan generation section 144 may generate an action plan for freely selected segments.

The action plan is, for example, composed of plural events to be sequentially executed. The events include, for example: a deceleration event that causes the vehicle M to decelerate, an acceleration event that causes the vehicle M to accelerate, a lane-keep event that causes the vehicle M to travel without departing from the travel lane, a lane-change event that causes the travel lane to change, an overtake event that causes the vehicle M to overtake the vehicle in front, a junction event that causes a lane change to the desired lane at a junction point or causes the vehicle M to travel so as not to depart from the current travel lane, a merge event that causes the vehicle M to accelerate or decelerate in a merging lane for merging with a main lane and changes the travel lane, and a handover event that causes a transition from the manual driving mode to the automated driving mode at a starting point of automated driving or causes a transition from the automated driving mode to the manual driving mode at a point where automated driving is expected to end. The action plan generation section 144 sets a lane-change event, a junction event, or a merge event at places where the target lane determined by the target lane determination section 110 switches. Information indicating the action plan generated by the action plan generation section 144 is stored in the storage section 180 as the action plan information 184.

Figure 8:
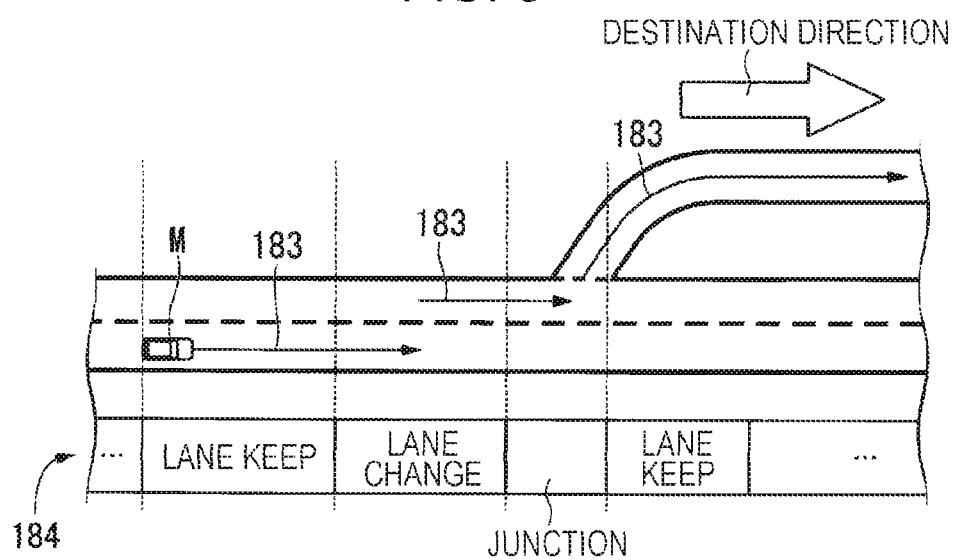
FIG. 8 is a diagram illustrating an example of an action plan generated for a given segment.

FIG. 8 is a diagram illustrating an example of the action plan generated for a given segment. As illustrated in this figure, the action plan generation section 144 generates the action plan needed for the vehicle M to travel in the target lane indicated by the target lane information 183. Note that the action plan generation section 144 may dynamically change the action plan irrespective of the target lane information 183, in accordance with changes to the conditions of the vehicle M. For example, in cases in which the speed of a nearby vehicle recognized by the environment recognition section 142 during vehicle travel exceeds a threshold value, or the movement direction of a nearby vehicle traveling in a lane adjacent to the vehicle-itself lane is toward the vehicle-itself lane direction, the action plan generation section 144 changes an event set in the driving segments that the vehicle M was expected to travel. For example, in cases in which events have been set such that a lane-change event is to be executed after a lane-keep event, when, during the lane-keep event, the recognition result of the environment recognition section 142 has determined that a vehicle is approaching from the rear in the lane change target lane at a speed at or above a threshold value, the action plan generation section 144 may change the event following the lane-keep event from a lane-change event to a deceleration event, a lane-keep event, or the like. As a result, the vehicle control system 100 can cause the vehicle M to autonomously travel safely even in cases in which a change occurs to the state of the environment.

Figure 9:
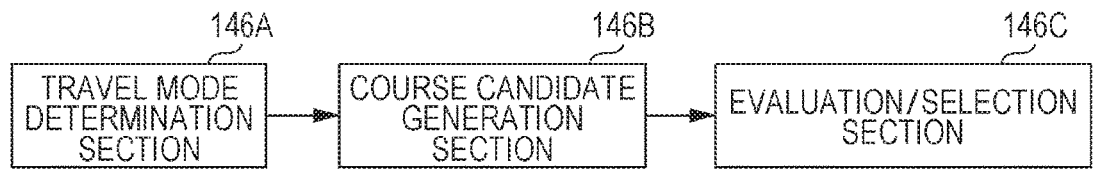
FIG. 9 is a diagram illustrating an example of a configuration of a course generation section.

FIG. 9 is a diagram illustrating an example of the configuration of the course generation section 146. The course generation section 146 includes, for example, a travel mode determination section 146A, a course candidate generation section 146B, and an evaluation/selection section 146C.

When implementing a lane-keep event, the travel mode determination section 146A, for example, determines a travel mode from out of constant speed travel, following-travel, low speed following-travel, decelerating travel, curve travel, obstacle avoidance travel, or the like. In such cases, the travel mode determination section 146A determines that the travel mode is constant speed travel when no other vehicles are present ahead of the vehicle M. The travel mode determination section 146A determines that the travel mode is following-travel in cases such as when a vehicle in front is to be followed. The travel mode determination section 146A determines that the travel mode is low speed following-travel in a congested situation or the like. The travel mode determination section 146A determines that the travel mode is decelerating travel in cases in which deceleration of a vehicle in front has been recognized by the environment recognition section 142, and in cases in which an event for, for example, stopping or parking is implemented. The travel mode determination section 146A determines that the travel mode is curve travel in cases in which the environment recognition section 142 has recognized that the vehicle M is approaching a curve in the road. The travel mode determination section 146A determines that the travel mode is obstacle avoidance travel in cases in which the environment recognition section 142 has recognized an obstacle in front of the vehicle M. Moreover, when carrying out lane-change events, overtake events, junction events, merge events, handover events, or the like, the travel mode determination section 146A determines the travel mode in accordance with each event.

Figure 10:
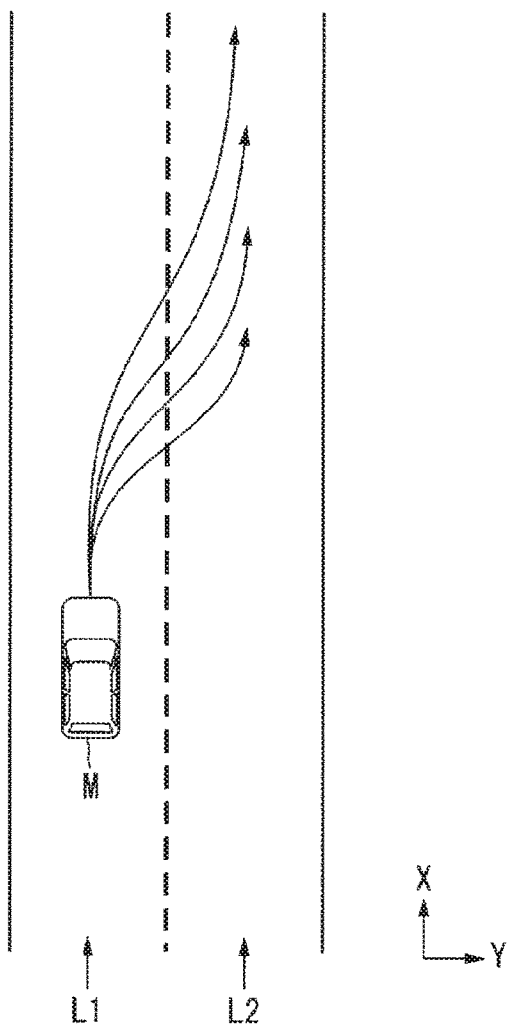
FIG. 10 is a diagram illustrating an example of course candidates generated by a course candidate generation section.

The course candidate generation section 146B generates candidates for a course based on the travel mode determined by the travel mode determination section 146A. FIG. 10 is a diagram illustrating example candidates for a course generated by the course candidate generation section 146B. FIG. 7 illustrates candidates for a course generated when the vehicle M changes lanes from a lane L1 to a lane L2.

Figure 11:
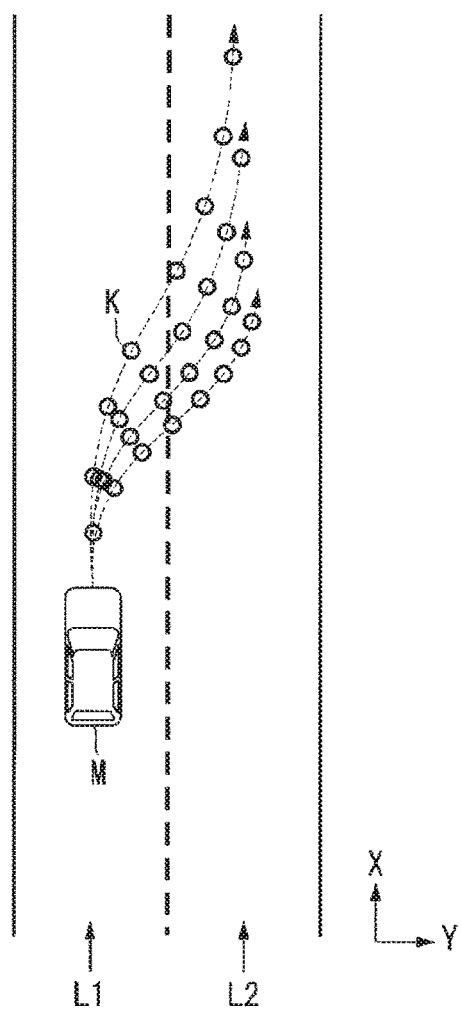
FIG. 11 is a diagram representing course candidates generated by a course candidate generation section as course points.

Courses such as illustrated in FIG. 10, for example, are determined by the course candidate generation section 146B as collections of target positions (course points K) where the reference position (for example, the center of mass or rear wheel axle center) of the vehicle M is to arrive at specific times in the future. FIG. 11 is a diagram illustrating candidates for a course generated by the course candidate generation section 146B, represented by course points K. The wider the separation between course points K, the faster the speed of the vehicle M, and the narrower the separation between course points K, the slower the speed of the vehicle M. Accordingly, the course candidate generation section 146B gradually widens the separations between the course points K when acceleration is desired, and gradually narrows the separations between the course points when deceleration is desired.

Thus, the course candidate generation section 146B needs to apply a target speed to each course point K since the course points K include a speed component. The target speed is determined in accordance with the travel mode determined by the travel mode determination section 146A.

Figure 12:
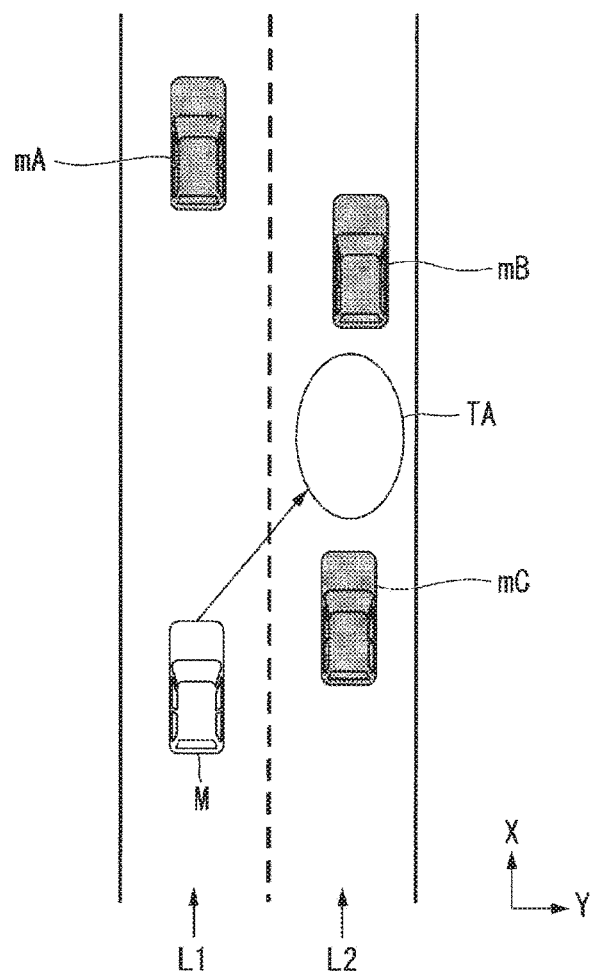
FIG. 12 is a diagram illustrating a vehicle lane change target position.

Explanation follows regarding a determination method for the target speed for performing a lane change (including at junctions). The course candidate generation section 146B first sets a lane change target position (or a merge target position). The lane change target position is set as a position relative to nearby vehicles, and determines "between which nearby vehicles to change lanes". The course candidate generation section 146B observes three nearby vehicles as references for the lane change target position, and determines a target speed for performing the lane change. FIG. 12 is a diagram illustrating a lane change target position TA. In this figure, L1 represents the lane of the vehicle, and L2 represents an adjacent lane. Here, a vehicle in front mA is defined as a nearby vehicle traveling directly in front of the vehicle M in the same lane as the vehicle M, a forward reference vehicle mB is defined as a nearby vehicle traveling directly in front of the lane change target position TA, and a rear reference vehicle mC is defined as a nearby vehicle traveling directly behind the lane change target position TA. The vehicle M needs to accelerate or decelerate to move to beside the lane change target position TA, but must avoid tailgating the vehicle in front mA at this time. The course candidate generation section 146B therefore predicts the future state of the three nearby vehicles and determines a target speed that will not interfere with any of the nearby vehicles.

Figure 13:
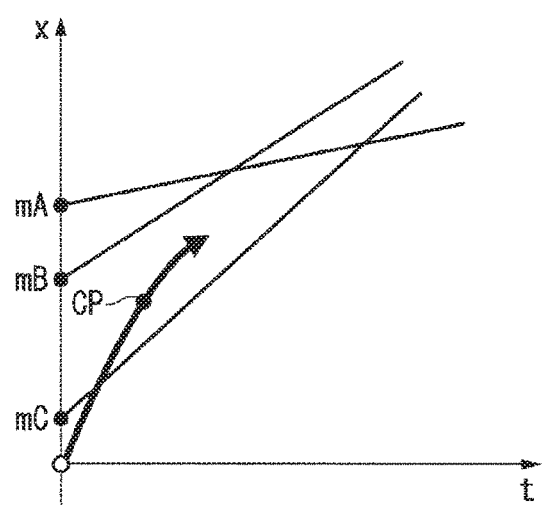
FIG. 13 is a diagram illustrating a speed generation model when the vehicle speeds of three nearby vehicles are assumed constant.

FIG. 13 is a diagram illustrating a speed generation model when the speed of the three nearby vehicles is assumed to be constant. In this figure, the straight lines extending from mA, mB, and mC each represent a displacement in the direction of progress when the nearby vehicles are assumed to be traveling at respective constant speeds. At a point CP where the lane change finishes, the vehicle M must be between the forward reference vehicle mB and the rear reference vehicle mC, and up to that point must be behind the vehicle in front mA. Under such restrictions, the course candidate generation section 146B derives plural time series patterns of target speeds up to when the lane change finishes. Then, the time series patterns of target speeds are applied to a model such as a spline curve to derive plural candidates for the course as illustrated in FIG. 11. Note that the movement pattern of the three nearby vehicles is not limited to that of constant speeds such as illustrated in FIG. 13, and may be predicted under the assumption of constant acceleration or constant jerk.

The evaluation/selection section 146C, evaluates, for example, the candidates for the course generated by the course candidate generation section 146B from the two viewpoints of plan achievability and safety, and selects a course to be output to the traction controller 160. From the viewpoint of plan achievability, a course is evaluated highly in cases in which, for example, the course closely follows a previously generated plan (for example, an action plan) and the total length of the course is short. For example, in cases in which a lane change to the right is desired, a course that temporarily changes lanes to the left and then returns is given a low evaluation. From the viewpoint of safety, for example, the further the distance between the vehicle M and an object (such as a nearby vehicle) and the smaller the amount of change in acceleration/deceleration, steering angle, or the like at each course point, the higher the evaluation.

The switch controller 150 switches between the automated driving mode and the manual driving mode based on a signal input from the automated driving changeover switch 87. The switch controller 150 also switches from the automated driving mode to the manual driving mode based on an operation on the configuration of the driving operation system of the HMI 70 instructing acceleration, deceleration, or steering. For example, the switch controller 150 switches from the automated driving mode to the manual driving mode (overrides) when a state in which an operation amount indicated by the signal input from the configuration of the driving operation system of the HMI 70 exceeds a threshold value has continued for a reference duration or longer. Note that after switching to the manual driving mode due to override, the switch controller 150 may return to the automated driving mode in cases in which operation on the configuration of the driving operation system of the HMI 70 has not been detected for a specific amount of time.

The driving characteristics derivation section 155 derives the driving characteristics for each vehicle occupant based on the operation history information 182. Distinguishing between vehicle occupants is described later. Driving characteristics use a function or the like to model characteristics of operation on the driving operation system of the HMI 70 during manual driving mode. Generally, there are differences between individuals with regard to depression of the accelerator pedal 71 and the brake pedal 74, or operation the steering wheel 78 due to the habits and the like of the individual. Accordingly, the driving characteristics derivation section 155 models the characteristics of operation on each of these operation systems by substituting a function, representative values, or the like into the model for each occupant. The driving characteristics subject to modeling include, for example, at least some characteristics out of characteristics related to the speed, forward acceleration, lateral acceleration, jerk, yaw rate, or steering angle of the vehicle M. Although explanation is given below regarding focusing on forward acceleration out of the driving characteristics to apply a specific modeling method, the method is not limited to just forward acceleration: in addition, lateral acceleration, jerk, yaw rate, and steering angle may also be similarly employed.

Figure 14:
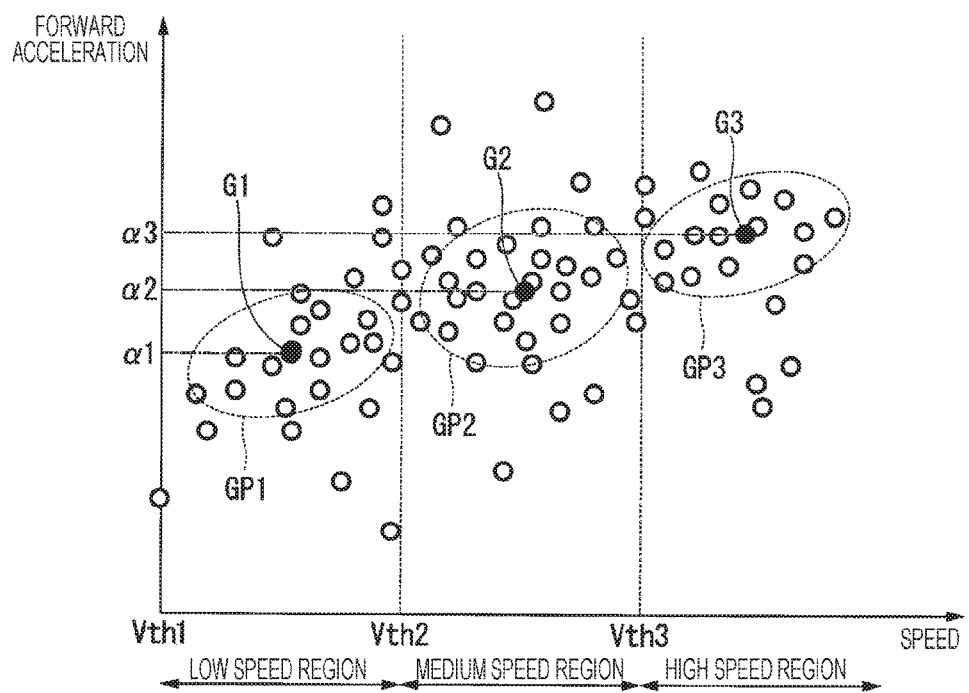
FIG. 14 is a diagram for explaining a method for deriving driving characteristics.

FIG. 14 is a diagram for explaining a method of deriving the driving characteristics. In the figure, for example, the driving characteristics derivation section 155 applies, for example, a method of clustering the speed into a low speed region (range) from the threshold value Vth1 to Vth2, a medium speed region (range) from Vth2 to Vth3, and a high speed region (range) of Vth3 and above, and points indicating forward acceleration are categorized into groups. In the figure, GP1 indicates a group of forward accelerations in the low speed region, GP2 indicates a group of forward accelerations in the medium speed region, and GP3 indicates a group of forward accelerations in the high speed region. The driving characteristics derivation section 155 derives a centroid G of forward acceleration for each categorized group. In the figure, G1 indicates a centroid GP1, G2 indicates a centroid of the group GP2, and G3 indicates a centroid of the group GP3. The driving characteristics derivation section 155 sets the forward acceleration (value) corresponding to the derived centroid G as a forward acceleration representing that speed region. In the figure, the representative value of the forward acceleration is set to $\alpha 1$ in the low speed region, is set to $\alpha 2$ in the medium speed region, and is set to $\alpha 3$ in the high speed region.

Moreover, the driving characteristics derivation section 155 may model the characteristics of operation on the driving operation system of the HMI 70 as an approximated curved line passing through the derived centroid G of the group GP in each speed region (three points in the example of the figure).

Figure 15:
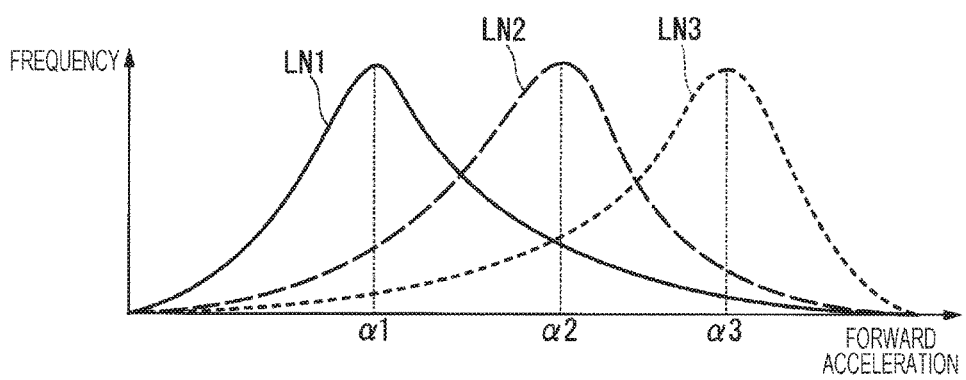
FIG. 15 is a diagram in which the distribution plot illustrated in FIG. 14 has been substituted with an occurrence frequency of forward accelerations.

Moreover, the driving characteristics derivation section 155 references the distribution plot of FIG. 14 described above, derives an occurrence frequency of the forward acceleration for each speed region, and sets the forward acceleration having the greatest occurrence frequency as the representative value of that speed region. FIG. 15 is a diagram in which the distribution plot illustrated in FIG. 14 has been substituted with the occurrence frequency of the forward acceleration. In the figure, LN1 illustrates a curved line representing a trend in the occurrence frequency of the forward acceleration in the low speed region, LN2 illustrates a curved line representing a trend in the occurrence frequency of the forward acceleration in the medium speed region, and LN3 illustrates a curved line representing a trend in the occurrence frequency of the forward acceleration in the high speed region. In such a case, the driving characteristics derivation section 155 sets a forward acceleration $\alpha 1$ corresponding to the peak of the curved line LN1 as the representative value in the low speed region, sets a forward acceleration $\alpha 2$ corresponding to the peak of the curved line LN2 as the representative value in the medium speed region, and sets a forward acceleration $\alpha 3$ corresponding to the peak of the curved line LN3 as the representative value in the high speed region.

The driving characteristics derivation section 155 associates the driving characteristics modeled by a representative value or a function such as an approximation, with each occupant and with each road of the driving segments. The associated items of information are each stored in the storage section 180 as the occupant-specific driving characteristic information 186. FIG. 16 is a diagram illustrating an example of the occupant-specific driving characteristic information 186. In the figure, similarly to in the operation history information 182, the occupant-specific driving characteristic information 186 associates driving characteristics modeled for each actual type of road in the driving segment that was being traveled on with identification information (an occupant ID) for identifying the freely determined occupant using an image captured by the in-cabin camera 92 (person identification images). For example, in the case of a general road corresponding to the low speed region or the medium speed region, the forward acceleration is expressed and stored as a representative value out of $\alpha 1$ and $\alpha 2$ (one value), or as a function representing a straight line or curved line passing through freely selected points. Moreover, in the case of an expressway corresponding to the high speed region, the forward acceleration is expressed and stored as a representative value, this being $\alpha 3$, (one value) or as a function representing a straight line or curved line passing through freely selected points.

When the automated driving mode is executed by the automated driving controller 120, the traction controller 160 controls the traction drive force output device 200, the steering device 210, and the brake device 220 such that such that the vehicle M passes through the course generated by the course generation section 146 at the expected timings. In this event, the traction controller 160 references the occupant-specific driving characteristic information 186 and controls using the automated driving mode in which the driving characteristics of the manual driving mode are reflected. Explanation follows regarding the automated driving mode in which the driving characteristics of the manual driving mode are reflected, and this is specifically referred to as a "learned mode".

When notified of information relating to the automated driving mode by the automated driving controller 120, the HMI controller 170 references the mode-specific operation permission information 185, and controls the HMI 70 according to the classification of the automated driving mode.

FIG. 17 is a table illustrating an example of the mode-specific operation permission information 185. The mode-specific operation permission information 185 illustrated in FIG. 17 includes "manual driving mode" and "automated driving mode" as driving mode items. The mode-specific operation permission information 185 includes "Mode A", "Mode B", "Mode C", described above and the like under "automated driving mode". As items of the non-driving operation system, the mode-specific operation permission information 185 also includes "navigation operation", which is an operation on the navigation device 50, "content playback operation", which is an operation on the content playback device 85, "instrument panel operation", which is an operation on the display device 82, and the like. In the example of the mode-specific operation permission information 185 illustrated in FIG. 17, permissions are set for operations by the vehicle occupant on the non-driving operation system for each of the driving modes described above; however, the relevant interface devices are not limited thereto.

The HMI controller 170 determines the devices for which usage is permitted (part or all of the navigation device 50 and the HMI 70) and the devices for which usage is not permitted, by referencing the mode-specific operation permission information 185 based on the mode information acquired from the automated driving controller 120. The HMI controller 170 also controls permissions for receiving operations on the HMI 70 or the navigation device 50 of the non-driving operation system from a vehicle occupant based on the determination result.

For example, when the driving mode executed by the vehicle control system 100 is the manual driving mode, a vehicle occupant operates the driving operation system configuration of the HMI 70 (for example, the accelerator pedal 71, the brake pedal 74, the shift lever 76, the steering wheel 78, and the like). When the driving mode executed by the vehicle control system 100 is an automated driving mode such as Mode B or Mode C, the vehicle occupant has a responsibility to monitor the surroundings of the vehicle M. In such a case, in order to prevent activities other than driving (for example, operating the HMI 70) from distracting the attention of the vehicle occupant (driver distractions), the HMI controller 170 controls such that part or all of the non-driving operation system of the HMI 70 does not receive operations. At such times, in order to promote monitoring of the surroundings of the vehicle M, the HMI controller 170 may cause the presence of vehicles surrounding the vehicle M that have been recognized by the environment recognition section 142 and the state of these nearby vehicles to be displayed on the display device 82 using images or the like, and the HMI controller 170 may ensure confirmation operations are received by the HMI 70 in accordance with the situation the vehicle M is traveling.

When the driving mode is Mode A of the automated driving mode, the HMI controller 170 may ease driver distraction restrictions, and control such that non-driving operation system configuration that was not receiving operations now receives operations from the vehicle occupant. For example, the HMI controller 170 displays an image on the display device 82, outputs audio through the speaker 83, or plays back content from a DVD or the like on the content playback device 85. Note that in addition to content stored on a DVD or the like, the content played back by the content playback device 85 may include, for example, various content related to leisure and entertainment, such as television programming or the like. The "content playback operation" illustrated in FIG. 17 may also mean a content operation related to such leisure and entertainment.

Moreover, the HMI controller 170 feature extraction processing is respectively performed on an image captured by the in-cabin camera 92 and on a person identification image included in the driving characteristics derivation section 155, feature point matching or the like is performed for both images, and the occupant currently seated in the driver seat 88 is identified. The HMI controller 170 then determines whether or not there are driving characteristics corresponding to the identified occupant. In cases in which there are driving characteristics corresponding to the identified occupant, the HMI controller 170 uses the display device 82 to display a screen requesting permission to transition to a learned mode in which these driving characteristics have been reflected.

Figures 18, 19:
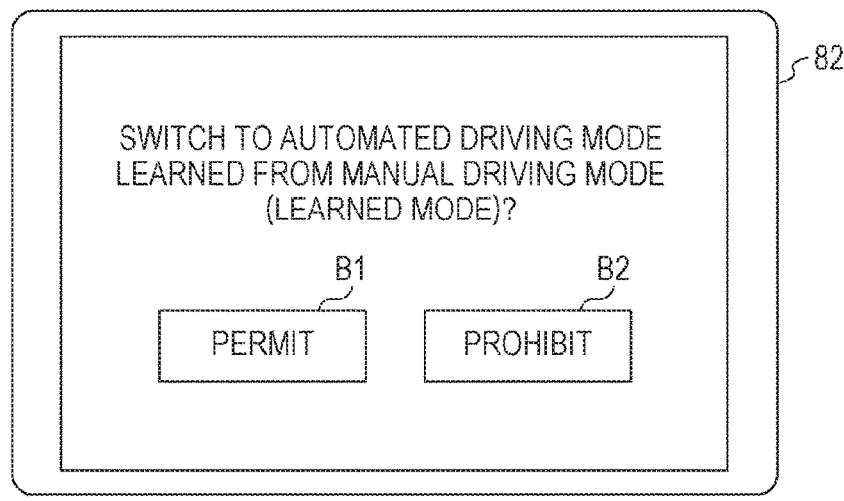
FIG. 18 is a diagram illustrating an example of a screen for requesting permission to transition to a learned mode.
FIG. 19 is a diagram illustrating content of learned modes according to each type of road.

FIG. 18 is a diagram illustrating an example of a screen for requesting permission to transition to the learned mode. As illustrated, a button B1 for permitting transition to the learned mode and a button B2 for prohibiting transition to the learned mode are displayed on the screen of the display device 82. For example, in cases in which the button B1 has been selected by a touch operation or the like, the traction controller 160 controls the traveling drive force output device 200, the steering device 210, and the brake device 220 in accordance with the learned mode. Note that in cases in which the button B2 has been selected by a touch operation or the like, the traction controller 160 controls in accordance with an automated driving mode that does not reflect the driving characteristics of the manual driving mode.

FIG. 19 is a diagram illustrating contents of the learned mode according to the type of road. As illustrated, when the driving characteristics are "A" on a general road, the automated driving mode reflecting the driving characteristics A is executed as the learned mode on the general road. Moreover, when the driving characteristics are "B" on an expressway, an automated driving mode reflecting the driving characteristics B are executed as the learned mode on the expressway.

Figure 20:
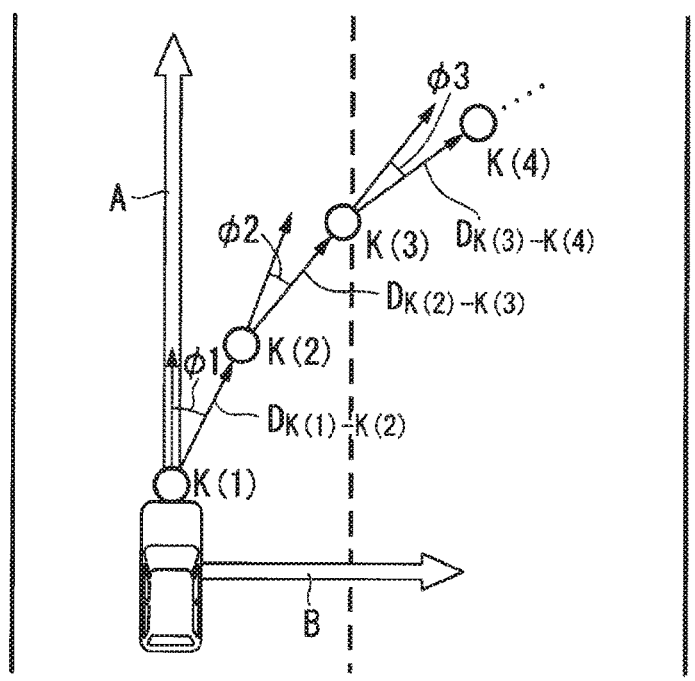
FIG. 20 is a diagram for explaining a method of vehicle control during the learned mode.

FIG. 20 is a diagram for explaining a method of vehicle control during the learned mode. In FIG. 20, K(i) represents each of the course points described above. Moreover, distance $D_{K(i)-K(i+1)}$) represents the distance between a course point K(i) and a course point K(i+1) corresponding to a target position that the vehicle M is expected to arrive at next after the course point K(i). Moreover, the course point K(i) includes a component that is an cornering angle φi for the vehicle M to progress in the direction of the course point K(i+1) corresponding to the target position where the vehicle M is next expected to arrive after the course point K(i). When the course point K(i) serves as a reference, the cornering angle φi is, for example, an angle famed between the vehicle axial direction of the vehicle M at the course point K(i), and the direction of the course point K(i+1) where the vehicle M is next expected to arrive. Moreover, the arrow A indicates forward acceleration and the arrow B indicates lateral acceleration.

The traction controller 160, for example, determines the speed between course points from the inter-course point distances $D_{K(i)-K(i+}1)$ and the timing of expected arrival for each course point K, and determines an amount of control on the traveling drive force output device 200 and the brake device 220 in accordance with this speed. Moreover, the traction controller 160, for example, determines a steering angle (yaw rate) based on information such as the cornering angle φi corresponding to each course point K(i), the vehicle speed (or acceleration or jerk) acquired from the vehicle sensor 60, and angular velocity about a vertical axis, and the traction controller 160 determines an amount of control on an electric motor in the steering device 210 such that the wheels are displaced in accordance with the steering angle.

For example, as the learned mode, when the occupant seated in the driver seat performs relatively sporty driving with a driving characteristic value greater than a reference value, the traction controller 160 controls the traveling drive force output device 200, the steering device 210, and the brake device 220 such that restrictions on the behavior of the vehicle M are relaxed compared to cases in which the driving characteristics of manual driving mode are not reflected. The reference value may, for example, be derived by averaging the driving characteristics of multiple occupants. For example, the traction controller 160 widens the inter-course point distances $D_{K(i)-K(i+}1)$ to be acquired and increases the cornering angles φi. A wide permissible range of behavior is accordingly set for the vehicle M, and sudden acceleration/deceleration and steering are permitted to some extent. As a result, the behavior of the vehicle M is more agile than in an automated driving mode that does not reflect the driving characteristics of the manual driving mode. In such cases, although the amount of consumption of energy, such as power from gasoline or a secondary battery, tends to increase, lane changes, overtaking, and the like are more easily executed and the destination may be arrived at more quickly.

Moreover, as the learned mode, when the occupant seated in the driver seat performs calm driving with a driving characteristic value smaller than the reference value, the traction controller 160 controls the traveling drive force output device 200, the steering device 210, and the brake device 220 such that the range of behavior of the vehicle M is narrower than in cases in which the driving characteristics of the manual driving mode are not reflected. For example, the traction controller 160 narrows the inter-course point distances $D_{K(i)-K(i+}1)$ to be acquired and decreases the cornering angles φi. The behavior of the vehicle M is accordingly subdued compared to when the automated driving mode does not reflect the driving characteristics of the manual driving mode. As a result, this suppresses giving the occupant feelings of unease such as causing travel sickness or the like. Moreover, consumption of energy can be suppressed, and economical travel can be achieved since sudden acceleration/deceleration, sudden steering, and the like are suppressed.

Note that instead of this driving characteristic reflection method, the driving characteristics may be reflected at the time when the course point K is generated. For example, the course candidate generation section 146B may increase the speed of the vehicle M by widening the placement separations of the course points K in cases in which the occupant seated in the driver seat performs relatively sporty driving with a driving characteristic value larger than the reference value, or may decrease the speed of the vehicle M by narrowing the placement separations of the course points K in cases in which the occupant seated in the driver seat performs calm driving with a lower driving characteristic value than the reference value.

Figure 21:
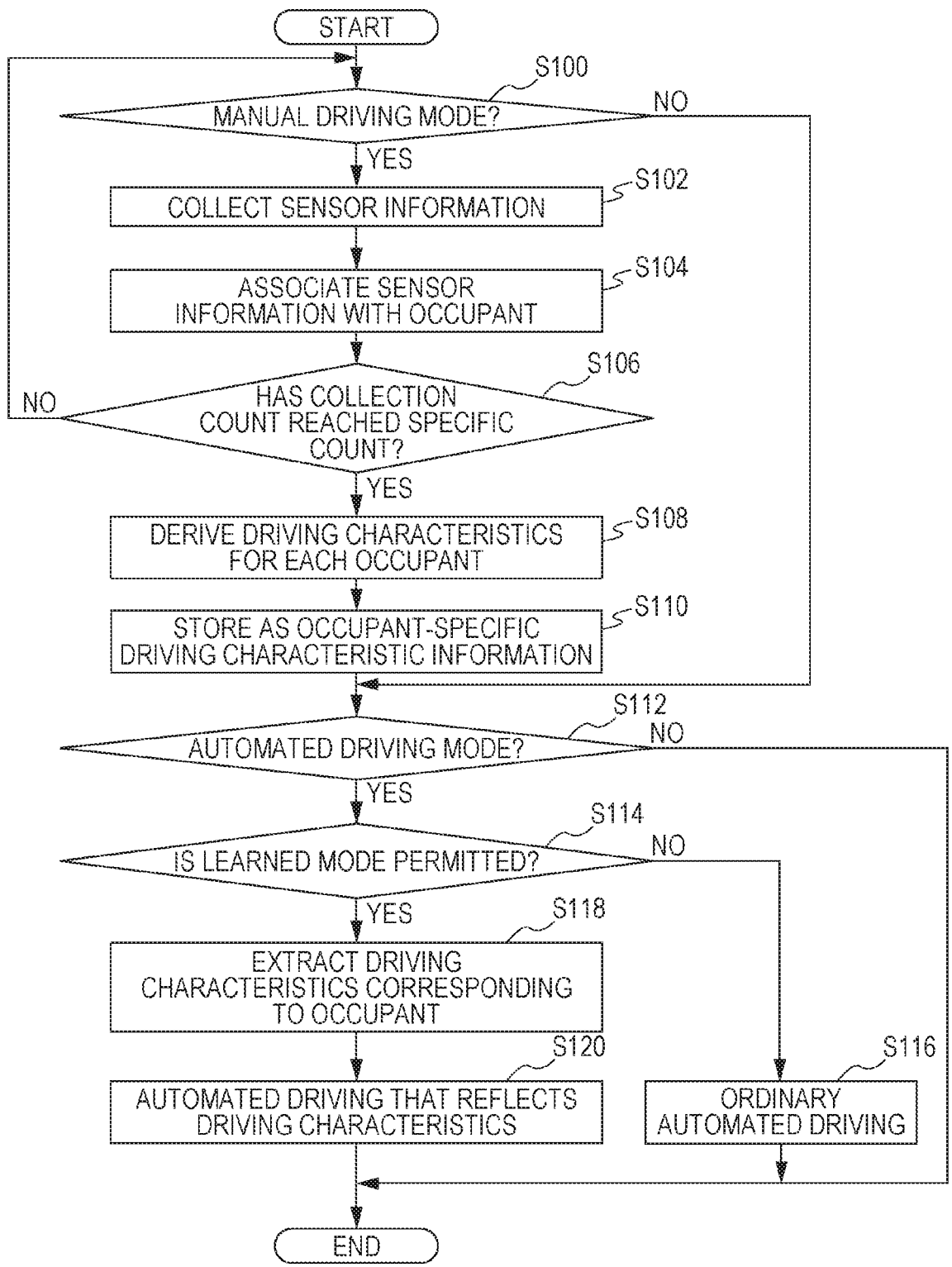
FIG. 21 is a flowchart illustrating an example of a flow of processing performed by a vehicle control system of a first embodiment.

FIG. 21 is a flowchart illustrating an example of a flow of processing performed by the vehicle control system 100 of the first embodiment. The processing of the present flowchart is, for example, repeatedly performed at specific periods.

First, the vehicle control system 100 determines whether or not the driving mode to be executed is the manual driving mode (step S100). In cases in which the driving mode to be executed is not the manual driving mode, the vehicle control system 100 causes processing to transition to S112, described later.

However, in cases in which the driving mode to be executed is the manual driving mode, the vehicle information collection section 105 collects information from the various sensors (step S102). Next, the vehicle information collection section 105 stores the collected sensor information and an image of the occupant captured by the in-cabin camera 92 in association with each other in the storage section 180 as the operation history information 182 (step S104).

Next, the vehicle information collection section 105 determines whether or not a collection count N of the sensor information has reached a specific count (step S106). In cases in which the collection count N of the sensor information has not reached the specific count, the vehicle information collection section 105 causes processing to return to S100, described above, and repeats collection of sensor information until the collection count N reaches the specific count.

However, in cases in which the collection count N of the sensor information has reached the specific count, the driving characteristics derivation section 155 derives the driving characteristics for each vehicle occupant based on the operation history information 182 (step S108). Next, the driving characteristics derivation section 155 stores the derived driving characteristics in the storage section 180 in association with each occupant and in association with the road of each driving segment as the occupant-specific driving characteristic information 186 (step S110).

Next, the traction controller 160 determines whether or not the driving mode to be executed is the automated driving mode (step S112). In cases in which the driving mode to be executed is not the automated driving mode, the traction controller 160 ends the processing of the present flowchart.

However, in cases in which the driving mode to be executed is the automated driving mode, the traction controller 160 determines whether or not a learned mode in which the driving characteristics from during the manual driving mode are reflected has been permitted (step S114). In cases in which the learned mode is not permitted, the traction controller 160 controls the traveling drive force output device 200, the steering device 210, and the brake device 220 using the ordinary automated driving mode that does not reflect the driving characteristics from during the manual driving mode (step S116).

However, in cases in which the learned mode has been permitted, the traction controller 160 references the occupant-specific driving characteristic information 186, extracts the driving characteristics corresponding to the occupant currently seated in the driver seat (step S118), and controls the traveling drive force output device 200, the steering device 210, and the brake device 220 using the learned mode in which the extracted driving characteristics have been reflected (step S120). The processing of the present flowchart is accordingly ended.

According to the first embodiment explained above, driving characteristics are derived for each occupant of the vehicle based on the sensor information collected when executing the manual driving mode, and an automated driving mode that reflects the derived driving characteristics of each occupant of the vehicle is executed, thereby enabling preferences of the user regarding control characteristics related to acceleration/deceleration or steering to be reflected in the automated driving.

Second Embodiment

Explanation follows regarding a second embodiment. The second embodiment differs from the first embodiment in that, for driving segments where the driving characteristics have not been derived, driving characteristics of the segment are estimated based on driving characteristics of other driving segments. Explanation follows focusing on this difference.

In cases in which it is expected in an action plan that the automated driving mode will be executed while the vehicle M is traveling on an expressway, the driving characteristics derivation section 155 of the second embodiment derives the driving characteristics of the occupant on general roads based on, out of the sensor information collected by the vehicle information collection section 105, sensor information collected when the vehicle M was traveling in the manual driving mode along a general road for which a set speed limit is equivalent to or stricter than the speed limit set on the expressway, and the driving characteristics derivation section 155 reflects the derived driving characteristics of the occupant on general roads in the automated driving mode on the expressway.

FIG. 22 is a diagram illustrating content of a learned mode according to different types of road. In the example in the figure, sensor information for an expressway has not been collected by the vehicle information collection section 105, or data of driving characteristics has not been stored because of reasons such as the collection count N of the sensor information being less than a specific count such that the reliability of the driving characteristics derivation is low. In such cases, the driving characteristics derivation section 155 of the second embodiment reflects, in the automated driving mode on both general roads and expressways, driving characteristics A derived for general roads.

FIG. 23 is a diagram for explaining a method of deriving the driving characteristics. For example, the driving characteristics derivation section 155 applies a clustering method or the like in a low speed region and a medium speed region and categorizes points indicating forward acceleration into groups. The driving characteristics derivation section 155 derives centroids G of the forward acceleration for each categorized group and derives a fitted straight line or curved line $LN_{fit}$ passing through these centroids G. A point G3# indicating a specific forward acceleration is then extrapolated on the derived fitted straight line $LN_{fit}$. For example, the speed of the point G3# indicating the forward acceleration to be extrapolated (a coordinate on a horizontal axis) may be set in accordance with the difference between respective speeds at centroids G1 and G2. For example, from the speed at the centroid G2 (Vth3−Vth2)/2, a point increased by the difference ΔV between the speed of the centroid G1 (Vth2−Vth1)/2 and the speed at the centroid G2 (Vth3−Vth2)/2 corresponds to the speed of the centroid G3# indicating the forward acceleration to be extrapolated. The driving characteristics derivation section 155 sets the forward acceleration corresponding to the derived extrapolation point G3# to the forward acceleration represented by that speed region. As illustrated in the figure, α3# is set as a representative value of the forward acceleration in the high speed region. Thus, based on the driving characteristics of another driving segment, the driving characteristics derivation section 155 estimates the driving characteristics of the driving segment where the driving characteristics have not been derived. In other words, based on the driving characteristics of another speed region, the driving characteristics derivation section 155 estimates the driving characteristics of a speed region where the driving characteristics have not been derived.

Note that in the example described above, although explanation has been given in which the driving characteristics of the high speed region have not been derived, there is no limitation thereto. The driving characteristics of a low speed region or a medium speed region may be not derived. For example, in cases in which the driving characteristics of a medium speed region have not been derived, supplemental processing such as interpolation may be performed to derive the driving characteristics of a speed region where the driving characteristics have not been derived.

FIG. 24 is a flowchart illustrating an example of a flow of processing performed by the vehicle control system 100 of the second embodiment. Processing of the present flowchart is configured by adding to the processing of the flowchart illustrated in FIG. 21 described above, processing to determine whether or not driving characteristics corresponding to a driving segment expected to be traveled are present (step S218).

First, the vehicle control system 100 determines whether or not the driving mode to be executed is the manual driving mode (step S200). In cases in which the driving mode to be executed is the manual driving mode, the vehicle control system 100 causes processing to transition to S212, described later.

However, in cases in which the driving mode to be executed is the manual driving mode, the vehicle information collection section 105 collects information from the various sensors (step S202). Next, the vehicle information collection section 105 stores the collected sensor information in association with the image of the occupant captured by the in-cabin camera 92 in the storage section 180 as the operation history information 182 (step S204).

Next, the vehicle information collection section 105 determines whether or not the collection count N of the sensor information has reached the specific count (step S206). In cases in which the collection count N of the sensor information has not reached the specific count, the vehicle information collection section 105 causes processing to return to S200 described above, and collection of sensor information is repeated until the collection count N reaches the specific count.

However, when the collection count N of the sensor information has reached the specific count, the driving characteristics derivation section 155 derives the driving characteristics for each vehicle occupant based on the operation history information 182 (step S208). Next, the driving characteristics derivation section 155 stores the derived driving characteristics in association with each occupant and each road of a driving segment in the storage section 180 as the occupant-specific driving characteristic information 186 (step S210).

Next, the traction controller 160 determines whether or not the driving mode to be executed is the automated driving mode (step S212). When the driving mode to be executed is the automated driving mode, the traction controller 160 ends processing of the present flowchart.

However, when the driving mode to be executed is the automated driving mode, the traction controller 160 determines whether or not the learned mode in which the driving characteristics during the manual driving mode have been reflected is permitted (step S214), and in cases in which the learned mode has not been permitted, controls the traveling drive force output device 200, the steering device 210, and the brake device 220 using the ordinary automated driving mode that does not reflect the driving characteristics during manual driving mode (step S216).

However, when the learned mode has been permitted, the traction controller 160 determines whether or not driving characteristics corresponding to the speed region of the driving segment expected to be traveled through are present (step S218). In cases in which driving characteristics corresponding to the speed region of the driving segment are not present, the driving characteristics derivation section 155 estimates the driving characteristics of the speed region for which driving characteristics are not present based on the driving characteristics of other speed regions (step S220).

In cases in which driving characteristics corresponding to the speed region of the driving segment are present, the traction controller 160 references the occupant-specific driving characteristic information 186 and extracts the driving characteristics corresponding to the occupant currently seated in the driver seat (step S222). The traction controller 160 then controls the traveling drive force output device 200, the steering device 210, and the brake device 220 using the learned mode in which the driving characteristics estimated by the driving characteristics derivation section 155 or the extracted driving characteristics have been reflected (step S224). The processing of the present flowchart thus ends.

According to the second embodiment explained above, similarly to in the first embodiment, the driving characteristics are derived for each occupant of the vehicle based on sensor information collected when the manual driving mode is executing, and the preferences of the user regarding control characteristics related to acceleration/deceleration or steering can be reflected in automated driving since the automated driving mode that has reflected the derived driving characteristics of each occupant of the vehicle is executed.

According to the second embodiment described above, for driving segments for which the driving characteristics have not been derived, the preferences of the user regarding control characteristics can be reflected in automated driving even when there is insufficient data related to driving characteristics, since the driving characteristics of the segment are estimated based on driving characteristics of other driving segments.

Third Embodiment

Explanation follows regarding a third embodiment. The third embodiment differs from the first and second embodiments in that, when the driving characteristics during the manual driving mode are reflected in the automated driving mode, gain is set in the driving characteristics to eliminate the difference between the speed sensation felt by the vehicle occupant in the manual driving mode and the speed sensation felt by the vehicle occupant in the automated driving mode. Explanation follows focused on this difference.

During the learned mode in which the driving characteristics during the manual driving mode have been reflected, the driving characteristics derivation section 155 of the third embodiment multiplies the target speed of the vehicle M learned from the speed during the manual driving mode by the gain. In general, the subjective speed sensation easily increases in the manual driving mode since the vehicle occupant is driving, but the speed sensation feels lowered in the automated driving mode since the vehicle occupant is no longer driving. Accordingly, in cases in which the vehicle M had, for example, been traveling at approximately 70 km/h during the manual driving mode, the driving characteristics derivation section 155 sets the target speed in the automated driving mode to a speed of 70 km/h or higher by multiplying 70 km/h by a specific scale factor, rather than simply reflecting the speed during manual driving mode. Accordingly, attacks on the senses like those when the speed of the vehicle M decreases are less liable to occur when switching from the manual driving mode to the automated driving mode.

Figure 25:
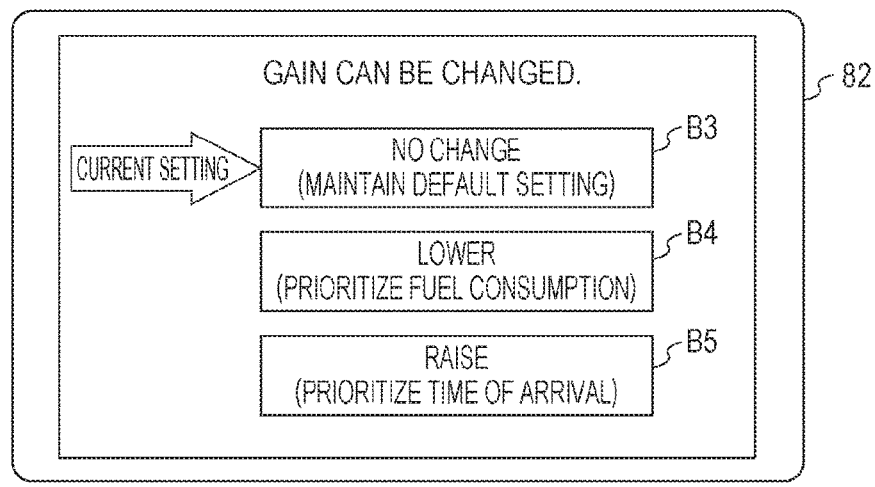
FIG. 25 is a diagram illustrating an example of a gain changing screen.

Moreover, the driving characteristics derivation section 155 may change the gain based on operation by the occupant. For example, the HMI controller 170 displays a gain changing screen using the display device 82. FIG. 25 is a diagram illustrating an example of the gain changing screen. As illustrated, for example, a button B3 that maintains the current setting without changing the gain, a button B4 that prioritizes fuel consumption and lowers the gain, and a button B5 that hastens arrival time and increases the gain as much as possible are displayed on the gain changing screen. The driving characteristics derivation section 155 changes the magnitude of the gain in accordance with one of these button operations. Namely, the driving characteristics derivation section 155 changes the value of the scale factor (coefficient) by which the speed during manual driving mode is multiplied. Reflecting the preferences of the vehicle occupant in automated driving can thus be better achieved.

Figure 26:
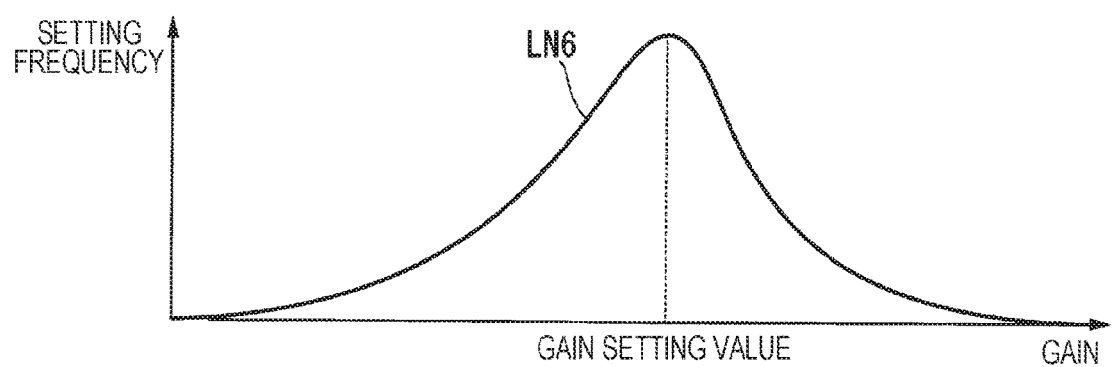
FIG. 26 is a diagram illustrating an example of setting frequencies of gain.

Moreover, the driving characteristics derivation section 155 further determines a gain value based on the frequency with which the gain is changed on the gain changing screen. FIG. 26 is a diagram illustrating an example of setting frequency of the gain. LN6 in the figure is a curved line indicating trends in frequency of gain setting changes against gain value. As illustrated, the driving characteristics derivation section 155, for example, determines the gain value having the greatest gain setting frequency as the gain setting value.

According to the third embodiment explained above, similar to in the first and second embodiments, similarly to in the first embodiment, the driving characteristics for each occupant of the vehicle are derived based on the sensor information collected when the manual driving mode is executed, and the automated driving mode in which the derived driving characteristics of each occupant of the vehicle have been reflected is executed, enabling the preferences of the user regarding control characteristics related to acceleration/deceleration or steering to be reflected in automated driving.

Moreover, according to the third embodiment described above, unease felt by the vehicle occupant during automated driving can be alleviated by setting the gain in the driving characteristics reflected in the automated driving mode.

According to the embodiments explained above, the vehicle control system 100 includes an automated driving controller 120, a collection section 105, and a driving characteristics derivation section 155. The automated driving controller 120 is configured to execute one driving mode from out of plural driving modes including an automated driving mode in which at least one of speed control or steering control of a vehicle is performed automatically, and a manual driving mode in which both the speed control and the steering control are performed based on operation by an occupant of the vehicle. The vehicle information collection section 105 is configured to collect information related to control history of one or both out of the speed control and the steering control performed based on operation by the occupant of the vehicle while the manual driving mode is being executed by the automated driving controller. The driving characteristics derivation section 155 is configured to derive driving characteristics for each occupant of the vehicle based on information collected by the vehicle information collection section 105. The automated driving controller 120 executes the automated driving mode in which the driving characteristics for each occupant of the vehicle derived by the driving characteristics derivation section 155 are reflected, enabling the preferences of the user regarding control characteristics related to acceleration/deceleration or steering to be reflected in automated driving.

Although explanation has been given above using embodiments for implementing the present disclosure, the present disclosure is not limited to these embodiments in anyway. Various additional modifications and substitutions may be made within a range not exceeding the spirit of the present disclosure. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle control system comprising:
an automated driving controller configured to execute one driving mode of a plurality of driving modes, the plurality of driving modes including an automated driving mode in which at least one of speed control or steering control of a vehicle is performed automatically, and a manual driving mode in which both the speed control and the steering control of the vehicle are performed based on operation by an occupant of the vehicle;
a collection controller configured to collect information related to control history of one or both of the speed control and the steering control of the vehicle performed based on the operation by the occupant of the vehicle while the manual driving mode is being executed by the automated driving controller; and
a driving characteristics derivation controller configured to derive driving characteristics for each occupant of the vehicle based on the information collected by the collection controller,
wherein the automated driving controller reflects, to the automated driving, the driving characteristics for each occupant of the vehicle derived by the driving characteristics derivation controller when executing the automated driving mode,
a route on which the vehicle travels includes different types of routes including a first type of route and a second type of route, the second type of route having the same or stricter speed limit compared to the speed limit of the first type of route,
when the vehicle travels on the first type of route, the automated driving controller determines whether there is derived driving characteristics for the first type of route, if there is not the derived driving characteristics for the first type of route, the automated driving controller uses the driving characteristics of the second type of route derived by using information collected when the vehicle traveled on the second type of route in the manual driving mode so as to reflect the driving characteristics of the second type of route to the automated driving mode for the first type of route.

2. The vehicle control system according to claim 1, wherein:
the driving characteristics include one selected from out of the group consisting of characteristics related to speed, acceleration, jerk, yaw rate, lateral acceleration, and steering angle of the vehicle.

3. The vehicle control system according to claim 1, wherein:
the automated driving controller executes one driving mode out of the plurality of driving modes based on an action plan of the vehicle including the route on which the vehicle is supposed to travel;
the collection controller collects the information related to the control history for each type of route the vehicle travels on; and
when the action plan plans execution of the automated driving mode while the vehicle is traveling on the first type of route, the driving characteristics derivation controller derives the driving characteristics of an occupant for the second type of route by using information collected when the vehicle traveled on the second type of route in the manual driving mode from out of the information collected by the collection controller.

4. The vehicle control system according to claim 1, wherein:
based on the information collected by the collection controller, the driving characteristics derivation controller derives the driving characteristics for each of a first speed range and a second speed range having a higher speed than the first speed range;
by using the driving characteristics derived for the first and second speed ranges, the driving characteristics derivation controller estimates the driving characteristics for a third speed range having a higher speed than the second speed range; and
the automated driving controller reflects the estimated driving characteristics to the automated driving when the vehicle travels on a route corresponding to the third speed range.

5. The vehicle control system according to claim 1, wherein:
the driving characteristics derivation controller obtains statistical frequency of the information collected by the collection controller, and derives the driving characteristics for each occupant of the vehicle by referring to the information having a high statistical frequency from out of the information collected by the collection controller.

6. The vehicle control system according to claim 5, wherein the driving characteristics derivation controller sets a gain applied to the derived driving characteristics so as to reduce a difference between a speed sensation felt by an occupant of the vehicle in the manual driving mode and a speed sensation felt by the occupant of the vehicle in the automated driving mode.

7. The vehicle control system according to claim 6, further comprising:
an operation device that receives operation from an occupant of the vehicle to change a setting of the gain,
wherein the driving characteristics derivation controller changes the gain set for the derived driving characteristics in accordance with the operation on the operation device.

8. The vehicle control system according to claim 7, wherein the driving characteristics derivation controller obtains statistical frequency of changed gain values, and changes the gain set for the derived driving characteristics to a value having the highest frequency.

9. A vehicle control method executed by an onboard computer, the method comprising steps of:
(i) executing, by the onboard computer, one driving mode of a plurality of driving modes, the plurality of driving modes including an automated driving mode in which at least one of speed control or steering control of a vehicle is performed automatically, and a manual driving mode in which both the speed control and the steering control of the vehicle are performed based on operation by an occupant of the vehicle;
(ii) collecting, by the onboard computer, information related to control history of one or both of the speed control and the steering control of the vehicle performed based on the operation by the occupant of the vehicle while the manual driving mode is being executed;
(iii) deriving, by the onboard computer, driving characteristics for each occupant of the vehicle based on the collected information; and
(iv) executing, by the onboard computer, the automated driving mode by reflecting the driving characteristics derived for each occupant of the vehicle to the automated driving,
wherein a route on which the vehicle travels includes different types of routes including a first type of route and a second type of route, the second type of route having the same or stricter speed limit compared to the speed limit of the first type of route,
when the vehicle travels on the first type of route, the step (iv) determines whether there is derived driving characteristics for the first type of route, if there is not the derived driving characteristics for the first type of route, uses the driving characteristics of the second type of route derived by using information collected when the vehicle traveled on the second type of route in the manual driving mode so as to reflect the driving characteristics of the second type of route to the automated driving mode for the first type of route.

10. A non-transitory computer readable medium storing a vehicle control program for causing an onboard computer to execute processing, the processing comprising:
(i) executing, by the onboard computer, one driving mode of a plurality of driving modes, the plurality of driving modes including an automated driving mode in which at least one of speed control or steering control of a vehicle is performed automatically, and a manual driving mode in which both the speed control and the steering control of the vehicle are performed based on operation by an occupant of the vehicle;
(ii) collecting, by the onboard computer, information related to control history of one or both of the speed control and the steering control of the vehicle performed based on the operation by the occupant of the vehicle while the manual driving mode is being executed;
(iii) deriving, by the onboard computer, driving characteristics for each occupant of the vehicle based on the collected information; and
(iv) executing, by the onboard computer, the automated driving mode by reflecting the driving characteristics derived for each occupant of the vehicle to the automated driving,
wherein a route on which the vehicle travels includes different types of routes including a first type of route and a second type of route, the second type of route having the same or stricter speed limit compared to the speed limit of the first type of route,
when the vehicle travels on the first type of route, the process (iv) determines whether there is derived driving characteristics for the first type of route, if there is not the derived driving characteristics for the first type of route, uses the driving characteristics of the second type of route derived by using information collected when the vehicle traveled on the second type of route in the manual driving mode so as to reflect the driving characteristics of the second type of route to the automated driving mode for the first type of route.

11. The vehicle control system according to claim 1, wherein:
the automated driving controller executes one driving mode out of the plurality of driving modes based on an action plan of the vehicle including a route on which the vehicle travel is supposed to travel;
the collection controller collects the information related to the control history for each type of route the vehicle travels on; and
when the action plan plans execution of the automated driving mode while the vehicle is traveling on the first type of route, the automated driving controller determines whether there is derived driving characteristics for the first type of route, if there is not the derived driving characteristics for the first type of route, the driving characteristics derivation controller estimates the driving characteristics for the first type of route by using the collected information for other type of route.

12. The vehicle control system according to claim 1, wherein:
the driving characteristics derivation controller groups the information collected by the collection controller into a plurality of groups, and for each of the groups, the driving characteristics derivation controller plots each of the information on a two-dimensional map and finds a centroid of the plotted information for the each of the groups, and
the driving characteristics derivation controller derives the information corresponding to the centroid as the driving characteristics.

13. The vehicle control system according to claim 5, wherein the driving characteristics derivation controller derives the driving characteristics by referring to the information having the highest statistical frequency from out of the information collected by the collection controller.

* * * * *